United States Patent
Satake et al.

(10) Patent No.: US 6,750,931 B2
(45) Date of Patent: Jun. 15, 2004

(54) LIQUID CRYSTAL ELECTRO-OPTICAL DEVICE AND ELECTRONIC APPLIANCE

(75) Inventors: Rumo Satake, Atsugi (JP); Takeshi Nishi, Atsugi (JP); Yoshiharu Hirakata, Atsugi (JP)

(73) Assignee: Semiconductor Energy Laboratory Co., Ltd., Kanagawa (JP)

( * ) Notice: Subject to any disclaimer, the term of this patent is extended or adjusted under 35 U.S.C. 154(b) by 0 days.

(21) Appl. No.: 10/259,884

(22) Filed: Sep. 30, 2002

(65) Prior Publication Data

US 2003/0020854 A1 Jan. 30, 2003

Related U.S. Application Data

(62) Division of application No. 09/321,714, filed on May 28, 1999, now Pat. No. 6,493,052.

(51) Int. Cl.[7] .............................................. G02F 1/1335
(52) U.S. Cl. ...................................................... 349/113
(58) Field of Search ........................................... 349/113

(56) References Cited

U.S. PATENT DOCUMENTS

| | | | |
|---|---|---|---|
| 4,813,768 A | * | 3/1989 | Hamaguchi et al. ........ 349/195 |
| 5,151,691 A | * | 9/1992 | Kuijk ........................... 345/91 |
| 6,300,241 B1 | | 10/2001 | Moore et al. |
| 6,384,886 B2 | | 5/2002 | Yamazaki et al. |
| 6,426,787 B1 | * | 7/2002 | Satake et al. ................ 349/138 |
| 6,493,052 B1 | * | 12/2002 | Satake et al. ................ 349/114 |

FOREIGN PATENT DOCUMENTS

| | | |
|---|---|---|
| JP | 04-178625 | 6/1992 |
| JP | 10-048626 | 2/1998 |

* cited by examiner

*Primary Examiner*—Tarifur R. Chowdhury
*Assistant Examiner*—Jeanne A. DiGrazio
(74) *Attorney, Agent, or Firm*—Eric J. Robinson; Robinson Intellectual Property Law Office, P.C.

(57) ABSTRACT

A liquid crystal display device is realized which is improved in light reflectivity on pixel electrodes to provide brightness at low cost and low power consumption. A dielectric multi-layered film having a first dielectric film (low refractive film) 105 and a second dielectric film (high refractive film) 106 is formed on a pixel electrode 104 connected to a TFT 102 formed on a substrate 101 having an insulation surface. This dielectric multi-layered film is determined in refractive index (n), center wavelength ($\lambda$) and film thickens (d) according to an equation $nd=\lambda/4$, to give an enhanced reflection effect.

28 Claims, 20 Drawing Sheets

CENTER WAVELENGTH OF HIGH
REFRACTIVE FILM: 550nm

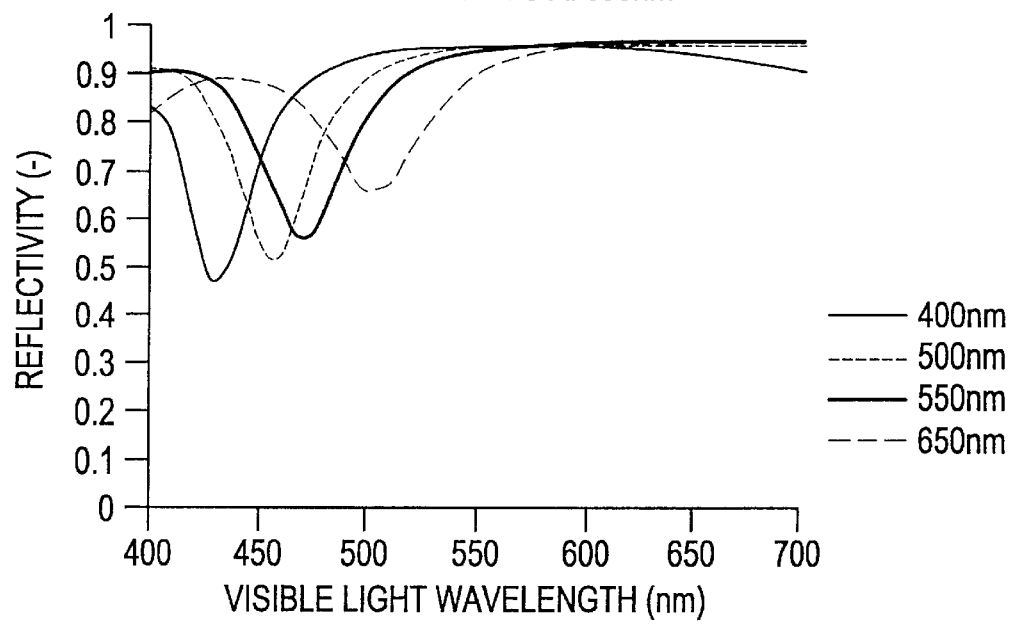
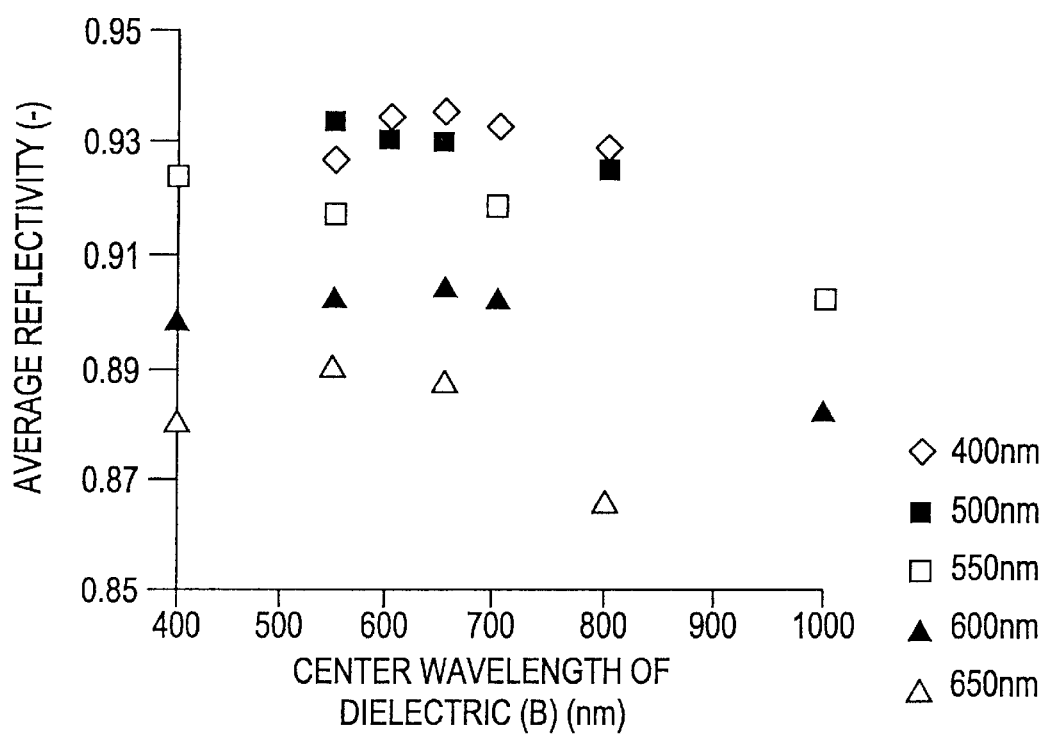

CENTER WAVELENGTH OF HIGH REFRACTIVE FILM: 650nm

CENTER WAVELENGTH OF HIGH REFRACTIVE FILM: 600nm

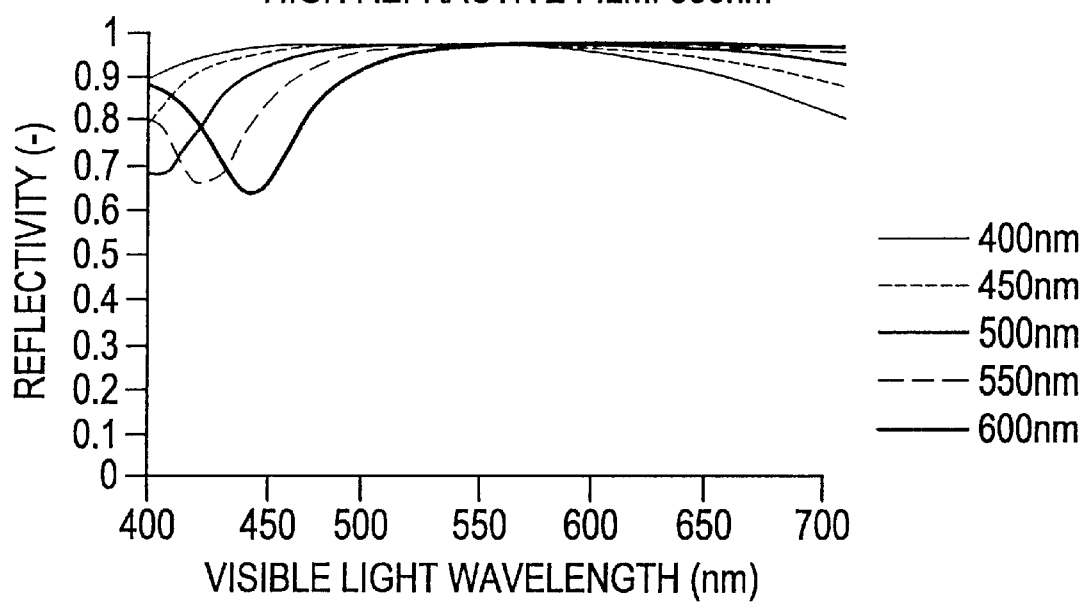

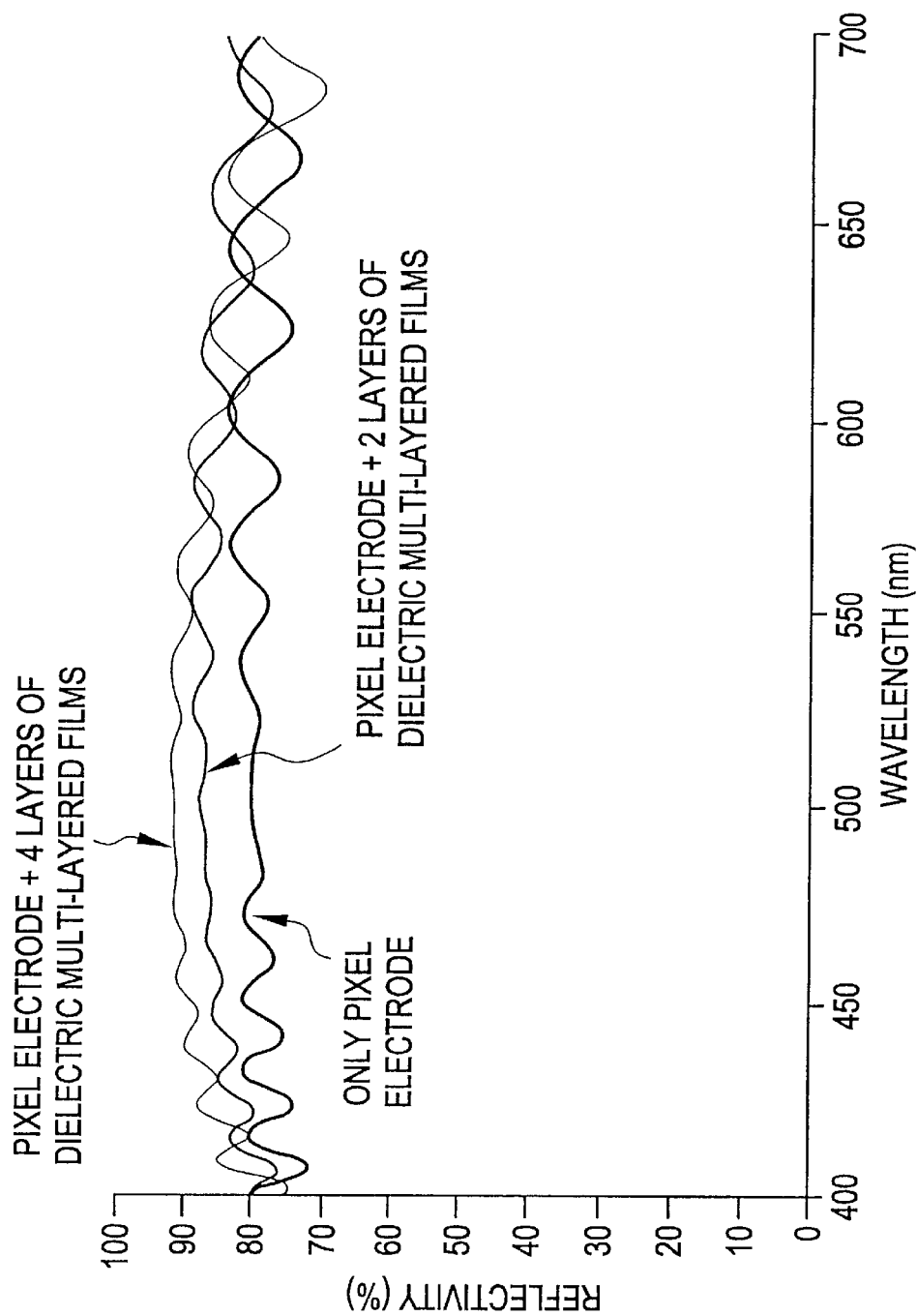

LIQUID CRYSTAL ELECTRO-OPTICAL DEVICE AND ELECTRONIC APPLIANCE

This is a division of Ser. No. 09/321,714 filed May 28, 1999, now U.S. Pat. No. 6,493,052.

BACKGROUND OF THE INVENTION

1. Field of the Invention

The present invention relates to a structure of a display device utilizing a liquid crystal as a display medium (called liquid crystal display device or LCD). More particularly, the invention is concerned with a technology on an electrode structure for applying a predetermined voltage to the liquid crystal.

2. Description of the Related Art

CRTs are most popular as conventional displays. However, the CRTs are large in volume, weight and power consumption, and particularly not suited as a display unit with a large screen. Under such a situation, attention has recently been drawn to liquid crystal display devices (hereinafter referred to as "liquid crystal panel") that are advantageous over the CRTs with respect to light-weight, low power consumption and large display screen.

Although the drive methods differ depending upon a liquid crystal kind used in a liquid crystal panel, there is known a drive method using liquid crystal birefringence. This is a drive method utilizing a nature that liquid crystal molecules have different dielectric constants between a longer axial direction and a shorter axial direction thereby controlling light polarization, transmission amount and further light scattering amount. The usable liquid crystal materials include a nematic liquid crystal, ferroelectric liquid crystal, anti-ferroelectric liquid crystal and so on.

In particular, there is a recent development for liquid crystal panels formed with a plurality of thin film transistors (TFT) using a thin film semiconductor on a glass substrate wherein circuits are formed by these TFTs. Such liquid crystal panels are particularly called an active matrix liquid crystal panel.

The active matrix liquid crystal panels are roughly divided in display scheme as a transparent type and a reflective type. In the reflective liquid crystal panel, the light transmitted through a liquid crystal layer is reflected by pixel electrodes provided on pixels. The reflection light (light containing image information) is received by a utilizer's eye thus making it possible to view images.

The reflective liquid crystal panel (hereinafter referred to as "reflective LCD") has an advantage that the effective pixel area is broad as compared to the transmission liquid crystal panel. This is due to no limitation in the opening ratio, which is different from the transmission liquid crystal panel. Consequently, the reflective type is capable of displaying with brightness higher than that of the transmission type.

However, it is that the reflective LCD undergoes higher light loss as compared to the transmission LCD. Consequently, the greatest problem with the reflective LCD hinges on how much incoming light is effectively utilized. That is, it is an essentially required factor to utilize light as much as possible and reduce light loss, in order to provide brighter display.

For these reasons, it is preferred to enhance the pixel electrode reflectivity as high as possible. This is because if the reflectivity is low the utilization efficiency of light considerably decreases thereby darkening the whole display.

Meanwhile, even if the backlight light amount is increased to increase display brightness, countermeasures will be required against problems of increasing power consumption and heat generation thus resulting in cost increase.

In order to reduce the light loss, the pixel electrodes for a reflective LCD use an aluminum based material (pure aluminum, aluminum alloy, or aluminum containing impurities) that is high in reflectivity. Incidentally, although silver electrodes are characterized by further high reflectivity, there is difficulty in formability. In many cases, the aluminum based material is utilized that is comparatively easy to handle.

However, it was revealed from a study by the present applicant that there is great reduction in reflectivity in a state that a material with high refractive index like an orientation film is formed on an electrode surface as compared to a case that an electrode formed by an aluminum based material is directly radiated by light.

In this manner, even if a high reflective material is selected for a pixel electrode, the reflectivity is impaired due to other factors. Further devising is desired toward increase in reflectivity.

The present invention provides a means for solving such a problem. That is, a technology is disclosed to improve the light reflection efficiency on the pixel electrode and hence improve the utilization efficiency of incoming light to a reflective LCD.

It is an object to realize a liquid crystal panel which is low in cost, bright and has low power consumption, and further realize an electronic appliance mounted with a liquid crystal panel as a display unit.

SUMMARY OF THE INVENTION

The present invention is characterized in that, in a reflective liquid crystal panel, reflective light is amplified by forming an enhanced reflective film by a dielectric multi-layered film on the pixel electrode thereby effectively utilizing the light.

Incidentally, the dielectric mirror is known as a technology utilizing an enhanced reflection effect on the dielectric multi-layered film. However, the dielectric mirror, in most cases, is formed by overlying eight or more layers. The directly connected capacitance that is formed by the dielectric mirror is extremely small.

In an actual liquid crystal panel, there is series connection of the dielectric multi-layered film capacitance ($C_d$) and the resultant capacitance ($C_{1c}$) of a liquid crystal and orientation film. Consequently, if the total capacitance is $C_{total}$, the following relation stands:

$$1/C_{total} = 1/C_d + 1/C_{1c}$$

Meanwhile, if the voltage applied to the resultant capacitance is $V_{total}$, the voltage applied to the liquid crystal and orientation film is $V_{1c}$, and the voltage applied to the dielectric multi-layered film is $V_d$, the following expression stands:

$$C_{total} V_{total} = C_d V_d = C_{1c} V_{1c}$$

By deforming this expression to determine a voltage applied to the liquid crystal, the following is obtained:

$$V_{1c} = C_d V_{total}/(C_{1c} + C_d)$$

That is, where the capacitance formed by the dielectric multi-layered film is low, there arises a problem that the voltage applied to the liquid crystal decreases.

However, the present invention takes it into consideration use of a dielectric multi-layered film as an electrode, and is reduced in the number of overlying layers, i.e. two layers or four layers. Because the capacitance of the dielectric multi-layered film is large as compared to the capacitance of the liquid crystal, an advantage is obtainable such that the present invention is free from the aforementioned problem that the voltage applied to the liquid crystal decreases.

Meanwhile, where the liquid crystal display device is driven in active matrix scheme, if a liquid crystal cell having no dielectric multi-layered film has a peak voltage $V_{LC.peak}$ and TFT switching element withstand voltage $V_{max}$, then in order to drive a liquid crystal cell having a dielectric multi-layered film within TFT withstand voltage, the dielectric multi-layered film must be controlled in the number of layers and film thickness to meet $V_{LC.peak} \leq C_d V_{max}/(C_{1c}+C_d)$.

Here, the peak voltage ($V_{LC.peak}$) means a voltage for giving a normally black mode brightness of 100% and a normally white mode brightness of 0% provided that a maximum brightness is taken 100% and a minimum brightness 0% on a V-T curve representative of a threshold characteristic of a liquid crystal cell having no dielectric multi-layered film, i.e., applied voltage to the liquid crystal cell (V) and liquid crystal cell brightness (T).

BRIEF DESCRIPTION OF THE DRAWINGS

FIGS. 5(A) to 5(E) are diagrams showing a reflectivity characteristic of the dielectric four-layered structure;

FIG. 6 is a diagram showing an average reflectivity of the dielectric four-layered structure;

FIGS. 8(A) to 8(C) are diagrams showing a reflectivity characteristic of the dielectric four-layered structure;

FIG. 10 is a diagram showing a reflectivity characteristic of a liquid crystal cell;

DETAILED DESCRIPTION OF THE PREFERRED EMBODIMENTS

Figure 1:
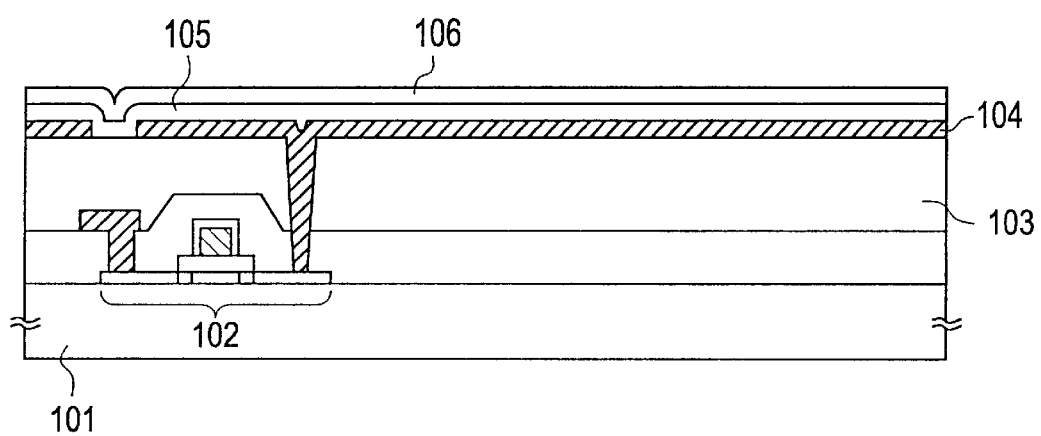
FIG. 1 is a view showing a pixel structure having a dielectric two-layered structure.

An embodiment of the present invention will be explained using FIG. 1. In FIG. 1, there is illustrated a sectional structure of a pixel formed on an active matrix substrate (substrate having circuits configured by TFTs) constituting for a reflective LCD.

In FIG. 1, 101 is a substrate having an insulation surface and 102 is a TFT formed by a known means. The TFT 102 can be readily formed by utilizing a technology described in JP-A-7-135318 publication filed by the present applicant.

The TFT 102 is covered with a planar film 103 over which a pixel electrode 104 is formed connecting to the TFT 102 through a contact hole. The pixel electrode 104 is preferably of a high reflective material, particularly an aluminum based material. It is of course possible to use other metal films (silver, tantalum, chromium, etc.).

After the pixel electrode 104 is formed, a first dielectric film 105 is formed. The first dielectric film 105 uses a material with a somewhat low refractive index of approximately 1.2–1.6. In particular, such a material includes acrylic resin, polyimide, magnesium fluoride, silicon dioxide.

On the first dielectric film 105 a second dielectric film 106 is formed. The second dielectric film 106 uses a material having a higher refractive index than that of the first dielectric film 105, preferably a material with a somewhat high refractive index of 1.8–2.5. Particularly, such a material includes titanium dioxide, zirconia, ITO (indium tin oxide), silicon nitride, cerium dioxide, etc.

Incidentally, although the dielectric film forming method may use a vapor phase method of low pressure thermal CVD, plasma CVD, sputter, evaporation, etc., it is effective to use a spin coat technique by applying a solution. The use of a spin coat technique provides an advantage that the dielectric multi-layered film can be planarized throughout with the pixel electrode step reduced.

In this case, a higher reflectivity is obtainable as a difference between a refractive index ($n_L$) of the first dielectric film 105 and a refractive index ($n_H$) of the second dielectric film 106 increases. This is evident from the following equation to calculate a reflectivity for a dielectric multi-layered film.

$$\text{Reflectivity } R=[\{n_m-n_{med}(n_L/n_H)^{2p}\}^2+k^2]/[\{n_m+n_{med}(n_L/n_H)^{2p}\}^2+k^2] \quad \text{[Equation 1]}$$

$n_m$: metal film refractive index
$n_{med}$: medium refractive index
$n_L$: refractive index of low refractive film
$n_H$: refractive index of high refractive film
k: metal film absorbing coefficient
p: the number of layers of dielectric multi-layer pairs From the above equation, it would be understood that, where refractive index ($n_L$) of the first dielectric film 105 and refractive index ($n_H$) of the second dielectric film 106 are great in difference therebetween, the ratio $n_L/n_H$ becomes small and hence the reflectivity (R) approaches 1, i.e. becoming nearly a state of total reflection.

Meanwhile, the first dielectric film 105 and the second dielectric film 106 are required to have such a relationship between refractive index and film thickness that the respective thin films fulfill increased reflecting conditions. The thin film increased reflecting condition is a condition where there is mutual intensification between the light reflected on a thin film surface and the light reflected on a thin film surface after transmitted through the thin film, which is given by the following equation.

[Equation 2]

$nd=\lambda/4$ n: refractive index d: film thickness

λ: center wavelength

In this equation, n is thin film refractive index, d is thin film thickness and λ is center wavelength of the light incident on the thin film. Incidentally, the center wavelength means a peak wavelength of light capable of effecting increased reflection. When the thin film is set such that its optical film thickness (refractive index×film thickness) is a quarter of a light center wavelength (λ), the thin film is referred to as a λ/4 film.

That is, if a refractive index and a center wavelength of incident light is determined, an optimal film thickness is determined from the equation of increased reflecting condition. In other words, if the refractive index is a value unique to the thin film, it is possible to control by the film thickness of the dielectric film where the wavelength assuming maximum in reflectivity (center wavelength) is to be set.

Where the center wavelength (λ) satisfying the increased reflecting condition is to be set is important because of wavelength dependency of a light reflected by the pixel electrode.

For example, where the reflective LCD of the present invention is applied to a single plate type projector or the like by providing a color filter on a single sheet liquid crystal panel, it is desired that the reflectivity is nearly constant over a wide range in a visible light range (approximately 400–700 nm wavelength region). By doing so, it is possible to secure an equivalent reflectivity if any color of red, green and blue comes.

Also, FIG. 1 exemplifies a dielectric multi-layered film having only two layers with the thin film with low refractivity (referred to as low refractive film, this refractive index is represented by $n_L$) and the thin film with high refractivity (referred to as high refractive film, this refractive index is represented by $n_H$). Alternatively, it is possible to form a structure overlying with a plurality of sets of two layer structures each formed by low and high refractive films.

That is, the enhanced reflection effect is theoretically raised by alternately overlaying an even number of dielectric layers different in refractive index in a manner of a low refractive film, high refractive film, low refractive film, high refractive film . . . . Consequently, if only the increased reflection effect is considered, a high reflectivity can be obtained by increasing the number of overlaying layers.

However, if the dielectric multi-layered film is increased in integrated film thickness, the capacitance of the dielectric films decreases. As a result, there encounters a disadvantage that the voltage to be applied to the liquid crystal is decreased (voltage loss due to the dielectric film). If this occurs, the voltage to drive the pixel increases, leading to increase in power consumption.

This is because of a series connection of the capacitance of the dielectric multi-layered film and the capacitance of the liquid crystal. In order to raise the voltage applied to the liquid crystal, it is required to increase the capacitance formed by the dielectric multi-layered film.

For this reason, it is preferred to reduce the integrated film thickness of the dielectric multi-layered film. It is therefore preferred to determine the number of overlaying numbers of dielectric films in the light of raising the enhanced reflection effect and suppressing the voltage loss due to the dielectric films.

According to a result of simulation conducted by the present applicant, even the most simplified structure as shown in FIG. 1 provides a sufficient enhanced reflection effect. Consequently, it can be said that a combination of a pixel electrode/low refractive film/high refractive film or a combination of a pixel electrode/low refractive film/high refractive film/low refractive film/high refractive film is favored as a structure for the dielectric multi-layered film.

Incidentally, the dominating term having a greatest effect upon the voltage loss of the dielectric film is a loss of a capacitance formed by the low refractive film. This is because the low refractive film is naturally low in relative dielectric constant and a capacitance to be formed tends to decrease. Consequently, the capacitance increase by the low refractive film effectively acts in suppressing the voltage loss due to the dielectric film.

In such a meaning, it is effective to provide the center wavelength for the low refractive film on a shorter wavelength side and the center wavelength for the high refractive film on a longer wavelength side. This is because with this structure the low refractive film is naturally decreased in film thickness and acts to increase the capacitance to be formed by the low refractive film.

The present invention constructed as above will be further explained based on embodiments described hereinbelow.

EMBODIMENTS

Embodiment 1

Now one embodiment of the present invention will be described. In this embodiment, explanation is made for a case that the invention is applied to a reflective LCD for a single plate type projector.

The reflective LCD of this embodiment is structured by pixels arranged corresponding to three primary colors of red, green and blue in an area corresponding to unit pixels. That is, the incoming light from a light source (white light) is passed through a color filter where it is turned into a light having a wavelength corresponding to each of red, green or blue color to be incident onto a pixel corresponding to the color.

Consequently, in this embodiment red, green and blue of wavelength light must be efficiently reflected by same-structured pixel electrodes. A flat reflection characteristic is required without having a dependency on wavelength within a visible light range (approximately 400–700 nm).

Also, in this embodiment explanation is made on a case of adopting a simplest two-layered structure (structure having two layers of a low refractive film and a high refractive film) in order to suppress the influence of voltage loss due to the dielectric film by a greatest possible degree. Incidentally, since such a structure falls under a structure shown in FIG. 1, the below explanation is based on FIG. 1.

The present applicant has conducted an experimental simulation and considered on a combination of a dielectric multi-layered film before preparing a structure as shown in FIG. 1. First, a structure of the present invention is explained here based on the experiment data.

The present applicant, in conducting the simulation, presumed a silicon dioxide film as a first dielectric film 105 (low refractive film) having a refractive index of 1.43. A zirconia film was presumed for a second dielectric film 106 (high refractive film) having a refractive index of 2.04.

First, simulation was conducted systematically to examine as to at what level center wavelengths were to be determined respectively for the first dielectric film 105 and the second dielectric film 106. This simulation was made to examine also on a case of $n_L=1.43$ and $n_H=2.04$ (case of $n_L/n_H=0.7$).

In this simulation, a condition that the visible light range (range having light wavelengths of 400–700 nm) has an average reflectivity (hereinafter merely referred to as "average reflectivity") of 0.91 or higher (91% or higher) was taken as a borderline, in order to select a condition of providing an average reflectivity higher than that.

Incidentally, the value 0.91 is a reflectivity of an aluminum film formed by evaporation. It is impossible for the conventional method to realize a reflectivity higher than that value as long as an aluminum based material is used. That is, the realization of an average reflectivity of higher than 0.91 is nothing more than a realization of a higher reflectivity that has not been achieved by the conventional method.

FIG. 2 shows a representative result of the simulation. In FIG. 2, plots were made with respect to wavelength on a horizontal axis and reflectivity on a vertical axis.

Figure 2A:
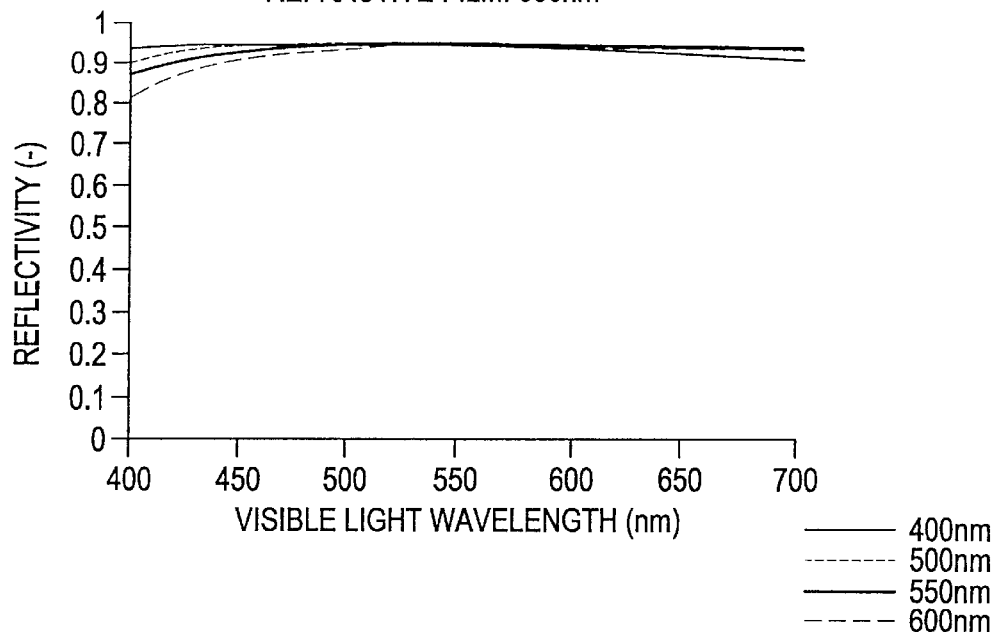
FIGS. 2(A) to 2(C) are diagrams showing a reflectivity characteristic of the dielectric two-layered film.
Figure 2B:
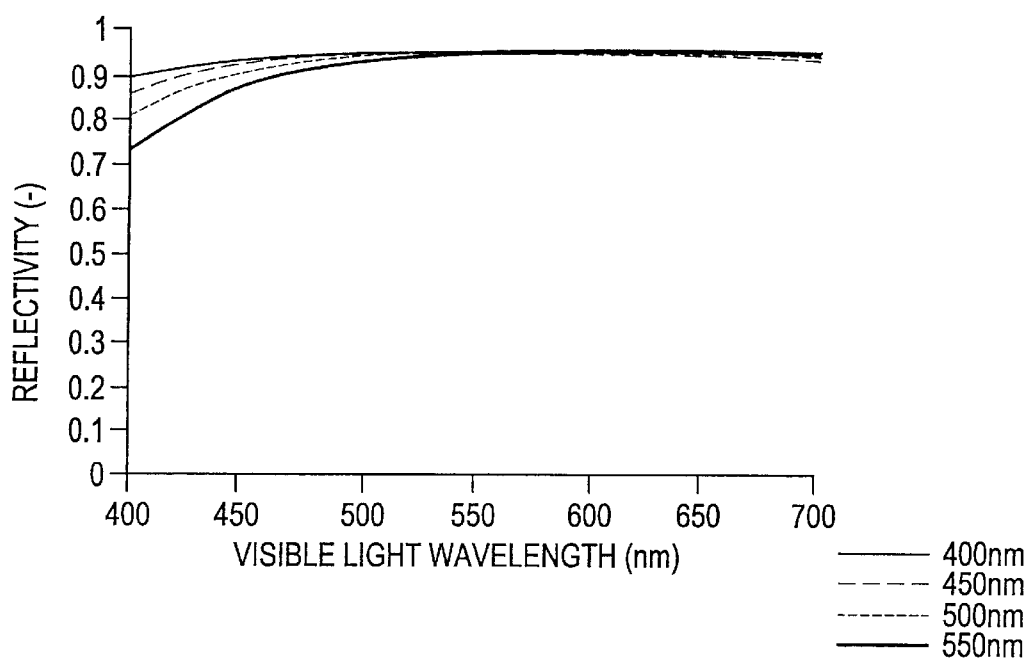
Figure 2C:
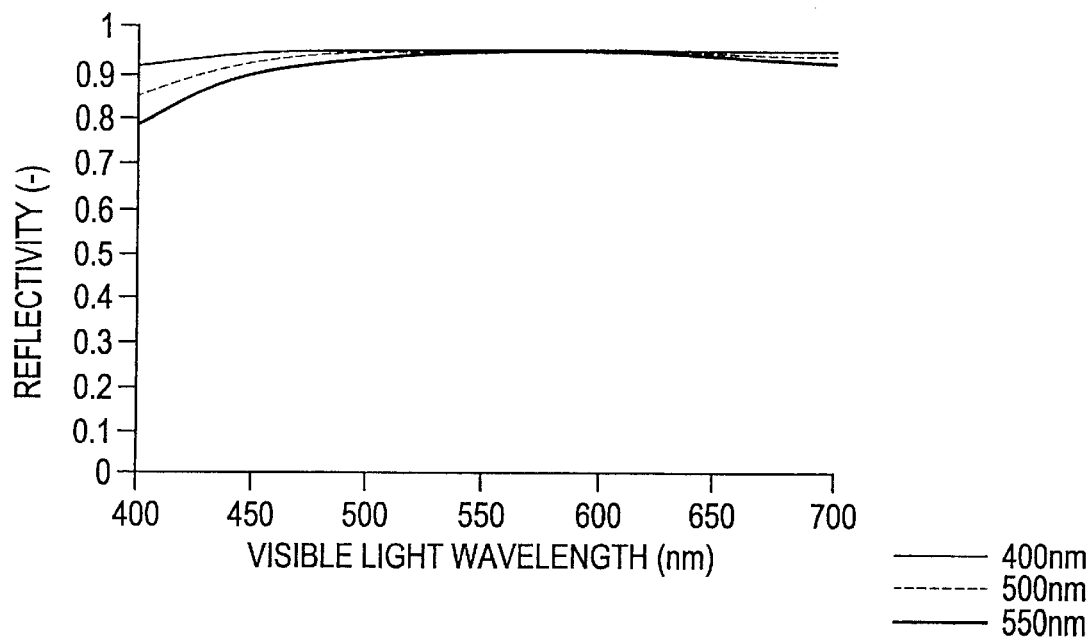

FIG. 2(A) represents a reflectivity characteristic that the high refractive film center wavelength is fixed at 650 nm with the low refractive film center wavelength varied as 400 nm, 500 nm, 550 nm and 600 nm. FIG. 2(B) is a case where the high refractive film center wavelength is fixed at 600 nm with the low refractive film center wavelength varied as 400 nm, 450 nm, 500 nm and 550 nm, while FIG. 2(C) is a case where the high refractive film center wavelength is fixed at 550 nm with the low refractive film center wavelength varied as 400 nm, 500 nm and 550 nm.

Incidentally, much more data was actually obtained wherein the tendency is generally the same, i.e. the tendency is toward reduction in reflectivity as the low refractive film has a center wavelength set closer to a longer wavelength side. That is, the low refractive film center wavelength is preferably set closer to a shorter wavelength side because it is capable of obtaining a higher reflectivity.

Figure 3A:
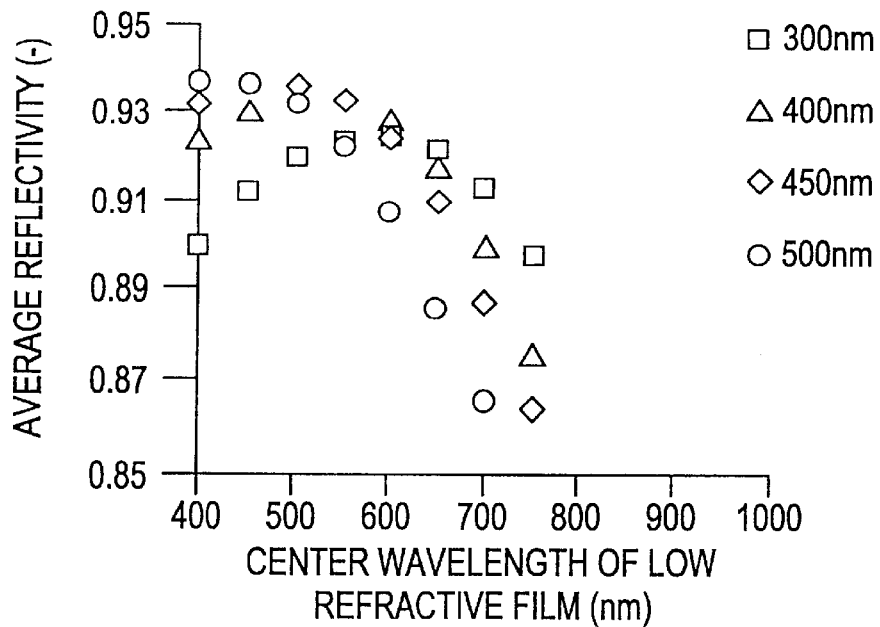
FIGS. 3(A) to 3(B) are diagrams showing an average reflectivity of the dielectric two-layered film.

FIGS. 3(A) and (B) show a result of the above simulations, which are graphs having plots made with respect to low refractive film center wavelength on a horizontal axis and visible light range (400–700 nm) average reflectivities on a vertical axis.

Figure 3B:
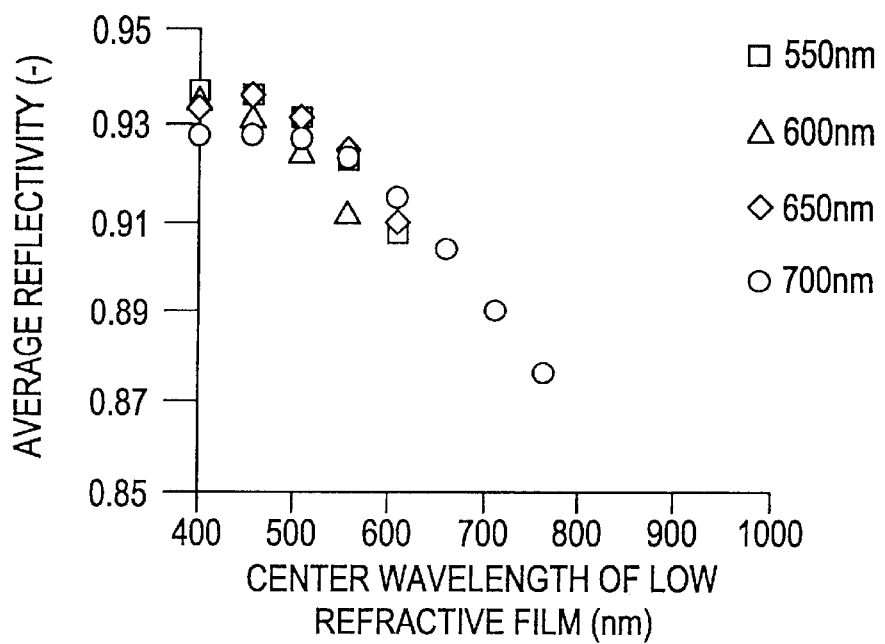

In FIG. 3, one plot point represents a visible light range average reflectivity. That is, it is possible to select a set condition for an optimal center wavelength by extracting plot points having average reflectivities of greater than 0.91.

In the graphs of FIGS. 3(A) and (B), if extracting and arranging conditions for average reflectivity of greater than 0.91, the following two conditions are obtained.

$$350\ nm \leq \lambda_L \leq 550\ nm,\ 380\ nm \leq \lambda_H \leq 700\ nm \quad (1)$$

$$450\ nm \leq \lambda_L \leq 650\ nm,\ 300\ nm \leq \lambda_H \leq 450\ nm \quad (2)$$

where $\lambda_L$ represents a low refractive film center wavelength and $\lambda_H$ a high refractive film center wavelength. If having a combination fallen under either range of (1) or (2), the average reflectivity can be greater than 0.91.

Meanwhile, a further higher average reflectivity is feasible by center wavelength setting. The conditions for giving a visible light range average reflectivity of greater than 92% are as follows.

$$400\ nm \leq \lambda_L \leq 500\ nm,\ 400\ nm \leq \lambda_H \leq 700\ nm \quad (1)$$

$$500\ nm \leq \lambda_L \leq 600\ nm,\ 300\ nm \leq \lambda_H \leq 450\ nm \quad (2).$$

These were obtained from simulation results. Incidentally, the meanings of $\lambda_L$, $\lambda_H$, etc. are similar to the above. Either condition of (1) or (2) if fulfilled is satisfactory.

Further, the condition for an average reflectivity of greater than 93% lies in $400\ nm \leq \lambda_L \leq 500\ nm$ and $450\ nm \leq \lambda_H \leq 700\ nm$ (the meanings of $\lambda_L$, $\lambda_H$, etc. are similar to the above).

It was confirmed that the higher the average reflectivity condition, the better in reflectivity flatness characteristic. That is, if the condition is set for higher average reflectivity, nearly a same reflectivity becomes obtainable over the entire visible light range.

In actuality, if a refractive index and center wavelength for the dielectric film is determined, then a film thickness is determined that is required for the dielectric film. Accordingly, the control on film thickness provides adjustment to a desired center wavelength. In the present invention, an enhanced reflective film is desirably formed by controlling the dielectric film thickness as above.

In this case, the thickness is determined based on an enhanced reflective condition for the first dielectric film 105 and the second dielectric film 106. That is, if the first dielectric film 105 has a refractive index $n_L$ and film thickness $d_L$ and the second dielectric film 106 a refractive index $n_H$ and film thickness $d_H$, they are controlled in a relationship satisfying $\lambda_L=4n_L\ d_L$, $\lambda_H=4n_H\ d_H$.

Accordingly, the film thickness is determined for the first dielectric film 105 and the second dielectric film 106 by combining the low refractive film center wavelength and the high refractive film center wavelength within the aforesaid range and converted into a film thickness according to the two equations.

Incidentally, the condition stated herein is one selected by considering only on the reflectivity. If a voltage loss is considered in addition to this condition, a more favorable condition is possible to select. That is, it is effective to increase the capacity formed by the low refractive film, i.e. decreasing the film thickness of the low refractive film thickness thinner than the film thickness of the high refractive film.

In the present embodiment the simulation was conducted on the case that the refractive index ($n_L$) of the low refractive film is 1.43 and the refractive index ($n_H$) of the high refractive film is 2.04. However, the result of this simulation is not limited to the combination of these refractive indexes.

Theoretically, the reflectivity increases with decrease in $n_L/n_H$ as represented by the aforesaid [Equation 1]. Accordingly, even if the refractive index ratio ($n_L/n_H$) is lower than 0.7, the reflectivity as a whole is in a trend toward increase. Consequently, there is no possibility of going under the borderline of average reflectivity 0.91. That is, it can be said that the above center wavelength set range always stands under the condition of $n_L/n_H \leq 0.7$.

Embodiment 2

This embodiment explains a structure having two dielectric multi-layered films (i.e. dielectric film four-layered structure) wherein one multi-layered film is formed by a low refractive film and a high refractive film. Explanation is based on FIG. 4.

Figure 4A:
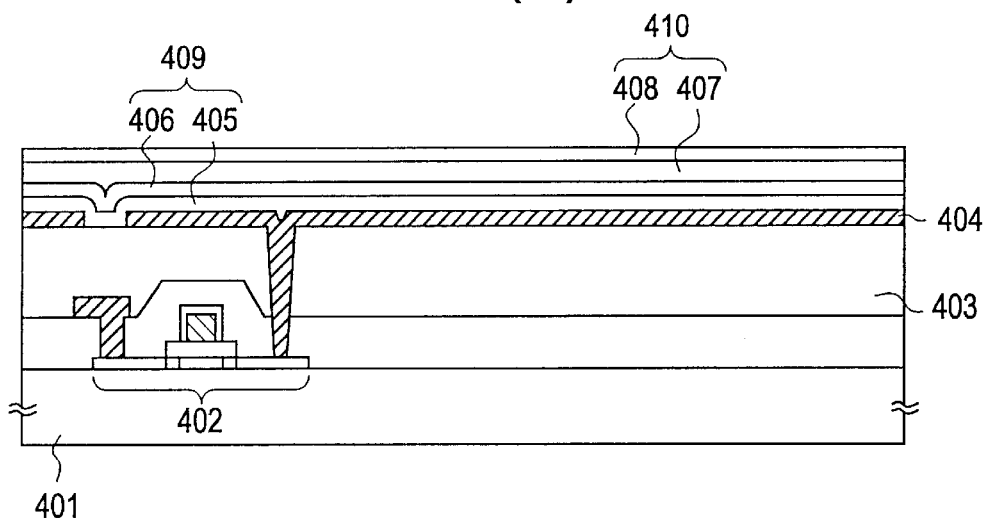
FIGS. 4(A) to 4(B) are views showing a pixel structure having a dielectric four-layered structure.

In FIG. 4(A), 401 is a substrate having an insulation surface and 402 is a TFT formed by a known means. The TFT 402 is covered with a planar film 403 over which a pixel electrode 404 is provided connecting to the TFT 402 through a contact hole. The pixel electrode 404 in this embodiment employs an aluminum film containing 1 wt % of titanium. This material is of course not limitative.

In this embodiment, over the pixel electrode 404 are formed a first dielectric film 405 (low refractive film), a second dielectric film 406 (high refractive film), a third dielectric film 407 (low refractive film) and a fourth dielectric film 408 (high refractive film). The first and third dielectric films used a material having a somewhat low refractive index of approximately 1.2–1.6, while the second and fourth dielectric films used a material having a somewhat high refractive index of approximately 1.8–2.5.

Meanwhile, in this embodiment a dielectric multi-layered film formed by the first and second dielectric films is referred to as a dielectric (A) 409, for convenience sake. Also, a dielectric multi-layered film formed by the third and fourth dielectric films is referred to as a dielectric (B) 410. In this case, it may be considered that the dielectric (A) 409 corresponds to the first dielectric film 105 in Embodiment 1 and the dielectric (B) 410 to the second dielectric film 106.

In this embodiment, the first dielectric film 405 and the second dielectric film 406 were set to have a same center wavelength (corresponding to a center wavelength $\lambda_A$ of the dielectric (A) 409). The third dielectric film 407 and the fourth dielectric film 408 were set to have a same center wavelength (corresponding to a center wavelength $\lambda_B$ of the dielectric (B) 410). Simulations were conducted by broadly combining these center wavelengths within the visible light range to thereby determine an optimal enhanced reflective condition.

Figure 4B:
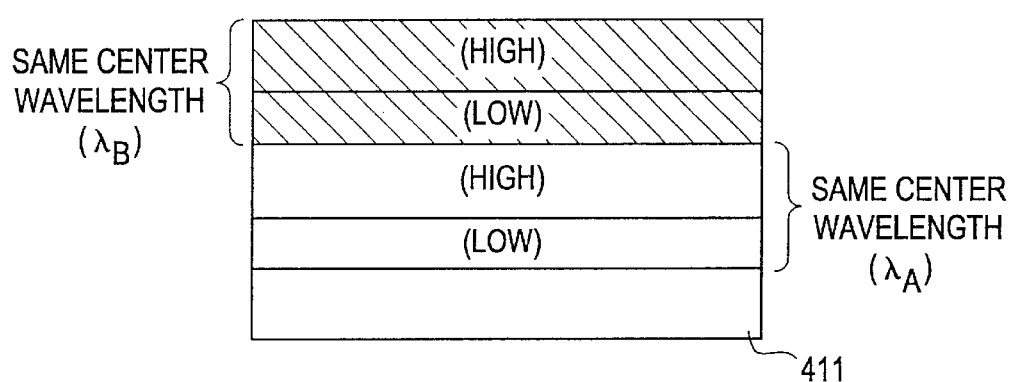
Figure 5A:
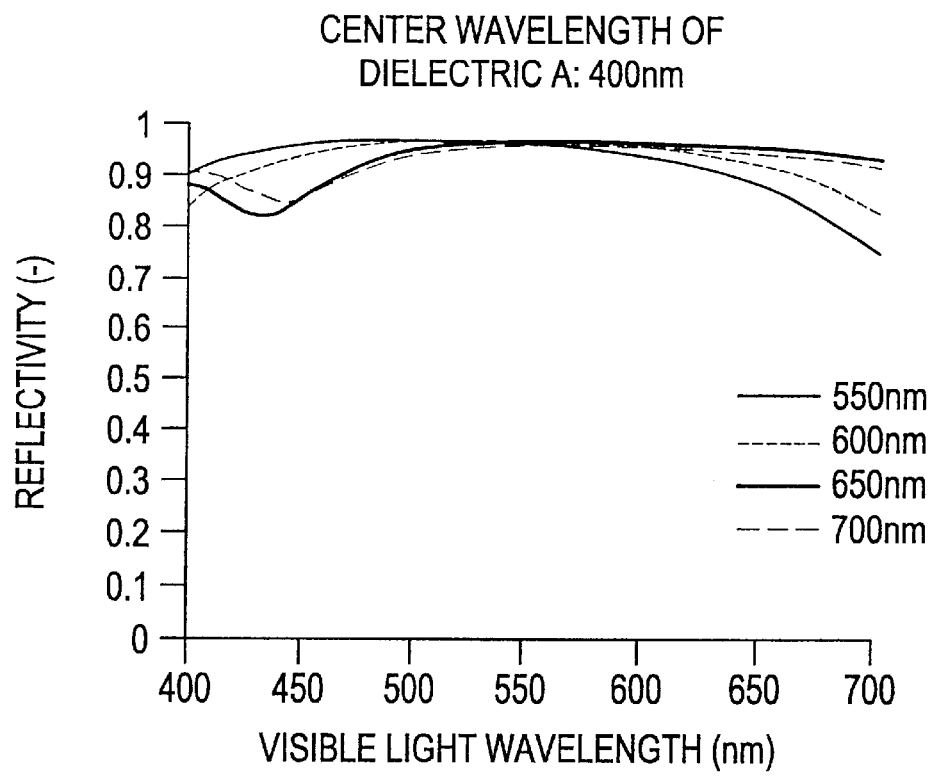
Figure 5B:
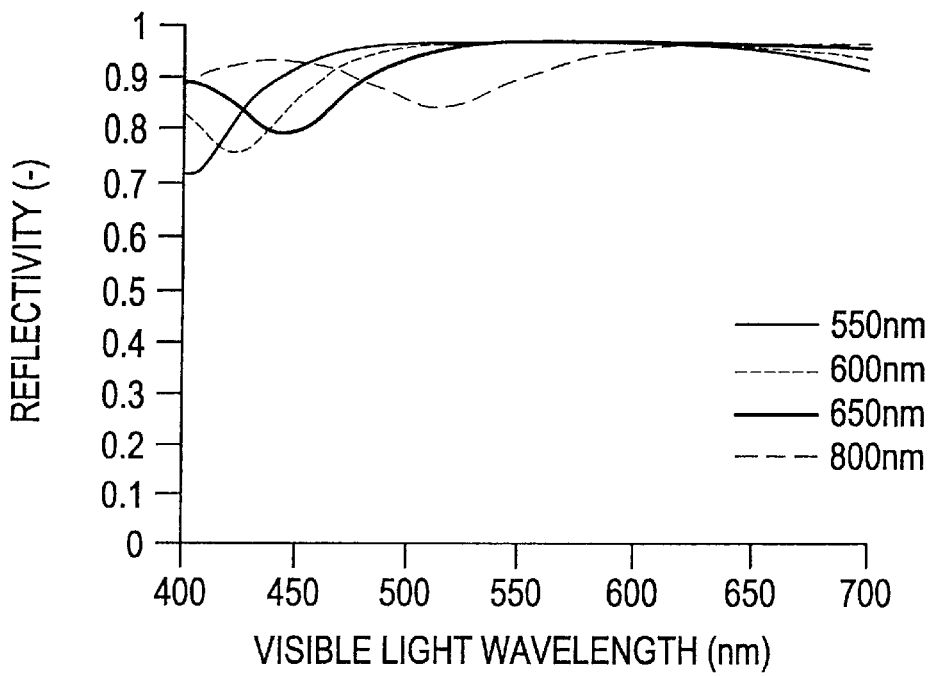
Figure 5C:
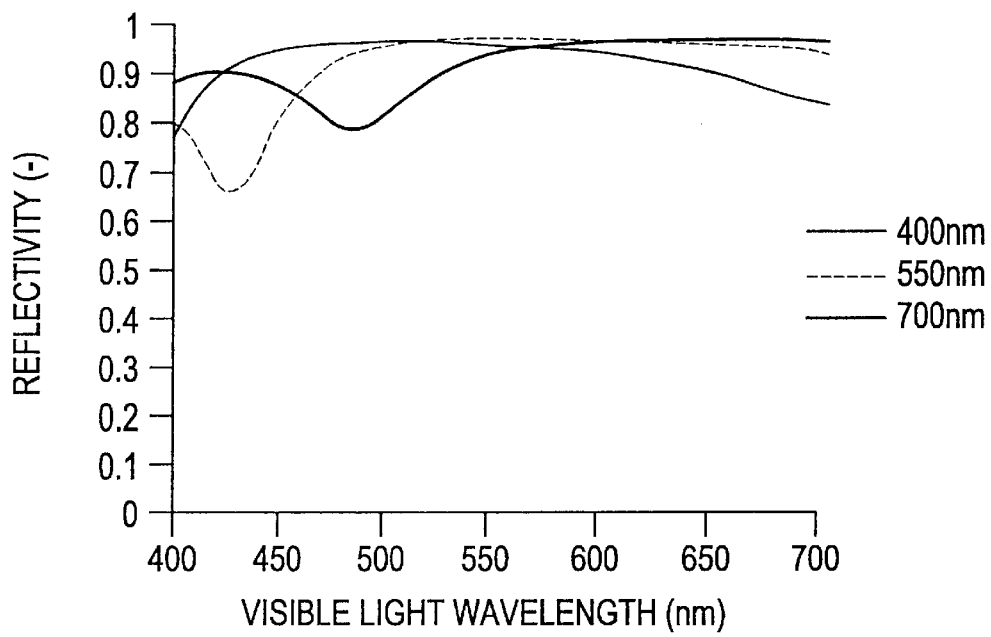
Figure 5D:
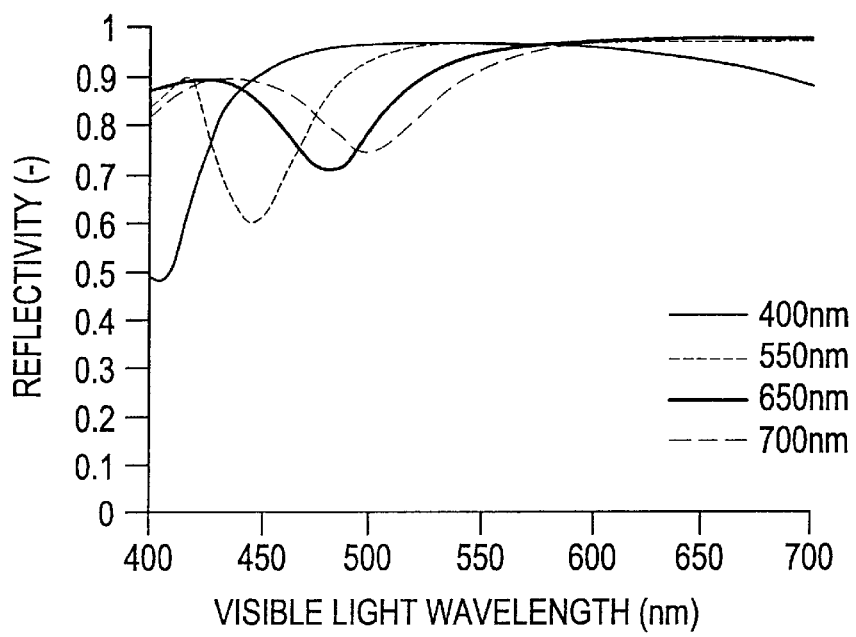

FIG. 4(B) shows a typical combination of refractive index and center wavelength. As shown in FIG. 4(B), high and low refractive films are alternately formed on the metal film 411 (pixel electrode). Here, (Low) means a low refractive film and (High) a high refractive film.

FIG. 5 demonstrates typical simulation results for the structure of the present embodiment. FIGS. 5(A)–(E) are graphs wherein plots were made with respect to wavelength on a horizontal axis and reflectivity on a vertical axis, wherein the center wavelength is varied for the dielectric (B) for respective cases that the center wavelength of the dielectric (A) is fixed at 400 nm, 500 nm, 550 nm, 600 nm and 650 nm. In the figures, the solid or dotted curved lines show a reflectivity characteristic for each center wavelength of the dielectric (B).

In actuality, much more data was acquired. However, they are similar in the meaning of a general trend. That is, there is a tendency that the wavelength range in which the reflectivity lowers shifts toward a longer wavelength side as the center wavelengths of the dielectrics (A), (B) are given to a longer wavelength side.

FIG. 6 demonstrates a collective representation of the above simulation results. In FIG. 6, plotting is given with data obtained by varying the dielectric (A) 409 center wavelength within a range of 400–650 nm wherein a horizontal axis represents dielectric (B) 410 center wavelength and a vertical axis visible light range average reflectivity. The refractive indexes were taken 1.43 for the low refractive film and 2.04 for the high refractive film, similar to Embodiment 1.

From FIG. 6, the present applicant determined 400 nm $\leq \lambda_A \leq$ 570 nm and 400 nm $\leq \lambda_B \leq$ 870 nm (provided that $\lambda_A$ is a center wavelength of the dielectric (A) and $\lambda_B$ a center wavelength of the dielectric (B)) for the condition under which the visible light range average reflectivity exceeds over 0.91. Further, determined was 400 nm $\leq \lambda_A \leq$ 500 nm and 600 nm $\leq \lambda_B \leq$ 700 nm ($\lambda_A$ and $\lambda_B$ are defined as above) for the condition under which the average reflectivity exceeds over 0.93.

As a consequence, where the first and third dielectric films have a refractive index $n_L$ and the second and fourth dielectric films have a refractive index $n_H$ with the first, second, third and fourth dielectric films given respective thickness $d_1$, $d_2$, $d_3$ and $d_4$, the first, second, third and fourth dielectric films are controlled in film thickness so as to satisfy 400 nm $\leq \lambda_A \leq$ 570 nm and 400 nm $\leq \lambda_B \leq$ 800 nm or otherwise 400 nm $\leq \lambda_A \leq$ 500 nm and 600 nm $\leq \lambda_B \leq$ 700 nm (provided that $\lambda_A = 4n_L\ d_1 = 4n_H\ d_2$, $\lambda_B = 4n_L\ d_3 = 4n_H\ d_4$).

Within the above range, it is possible to form a pixel electrode having an average reflectivity higher than 0.91 (preferably higher than 0.93) by properly setting the center wavelengths of the dielectric film (A) 409 and the dielectric film (B) 410.

In practice, the film thickness of the dielectric film formed by the low and high refractive films is controlled similarly to Embodiment 1 to have a desired center wavelength, forming an enhanced reflective film with a structure as stated above.

The above wavelength range will be wholly effective if refractive index ($n_L$) of the low refractive film and refractive index ($n_H$) of the high refractive film are combined to have a ratio ($n_L/n_H$) of smaller than 0.7, similar to Embodiment 1.

Meanwhile, it is effective to provide the low refractive film with a thickness smaller than the film thickness of the high refractive film in order to avoid against liquid crystal voltage loss due to dielectric capacitance, as was stated in Embodiment 1.

Embodiment 3

A pixel structure of this embodiment is explained with reference to FIG. 7. Incidentally, the structure is similar to that of FIG. 4 and the same parts to those of FIG. 4 are denoted by the same reference characters. This embodiment is formed, on a pixel electrode 404, on one another a first dielectric film 701 (low refractive film), a second dielectric film 702 (high refractive film), a third dielectric film 703 (low refractive film), and a fourth dielectric film 704 (high refractive film).

The first and third dielectric films employed a material having a somewhat low refractive index ($n_L$) of 1.2–1.6, while the second and fourth dielectric films used a material having a somewhat high refractive index ($n_H$) of 1.8–2.5.

In this embodiment a dielectric multi-layered film formed by the first and second dielectric films is referred to as a dielectric (C) 705 for convenience sake, while a dielectric multi-layered film formed by the third and fourth dielectric films is as a dielectric (D) 706.

In this embodiment, simulation was conducted by varying the center wavelength to be set for the dielectrics (C) and (D) in a manner different from Embodiment 2. That is, the center wavelengths for the first and third dielectric films 701, 703 (both low refractive films) were set at a same wavelength ($\lambda_L$), and further the center wavelengths for the second and fourth dielectric films 702, 704 (both high refractive films) were set at a same wavelength ($\lambda_H$).

Although in this embodiment the first and third dielectric films used the low refractive films with a same refractive index, they may be different in refractive index. In the present embodiment, there is no problem provided that overlying structures having low and high refractive films are formed in the respective unitary dielectrics (C) and (D).

With the above structure, simulation was made by broadly combining the both center wavelengths within the visible light range, thereby determining an optimal condition for enhanced reflection.

Figure 7A:
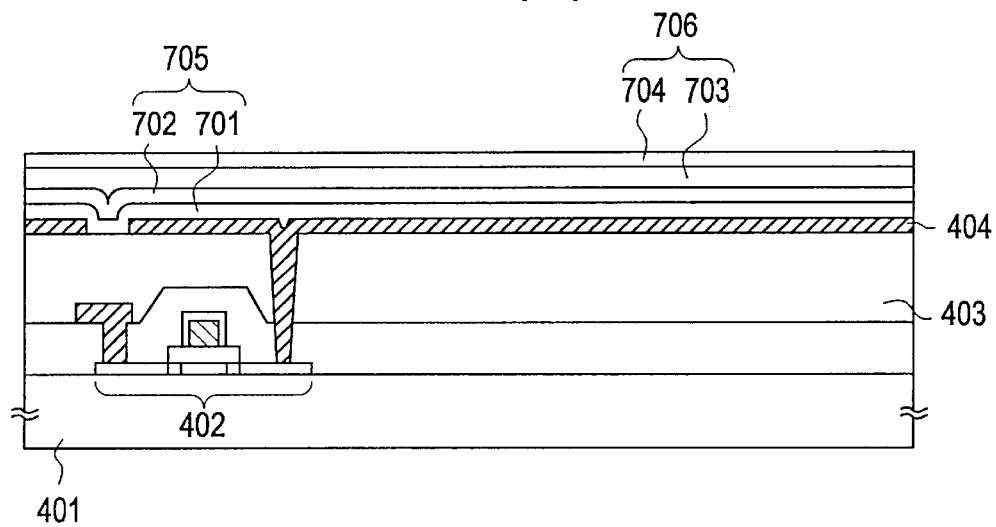
FIGS. 7(A) to 7(B) are views showing a pixel structure having a dielectric four-layered structure.
Figure 7B:
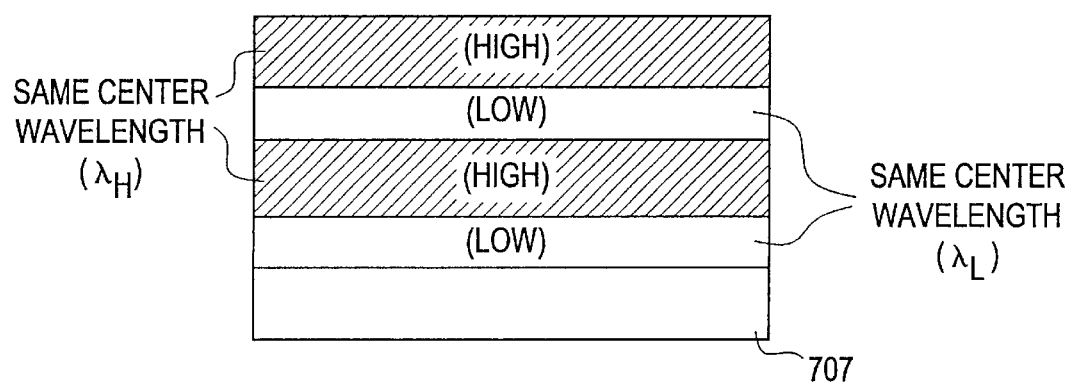

FIG. 7(B) shows a typical combination of refractive indexes. As shown in FIG. 7(B), high and low refractive films are alternately formed over the metal film 707 (pixel electrode). Of course, (Low) means a low refractive film and (High) a high refractive film.

Figure 8A:
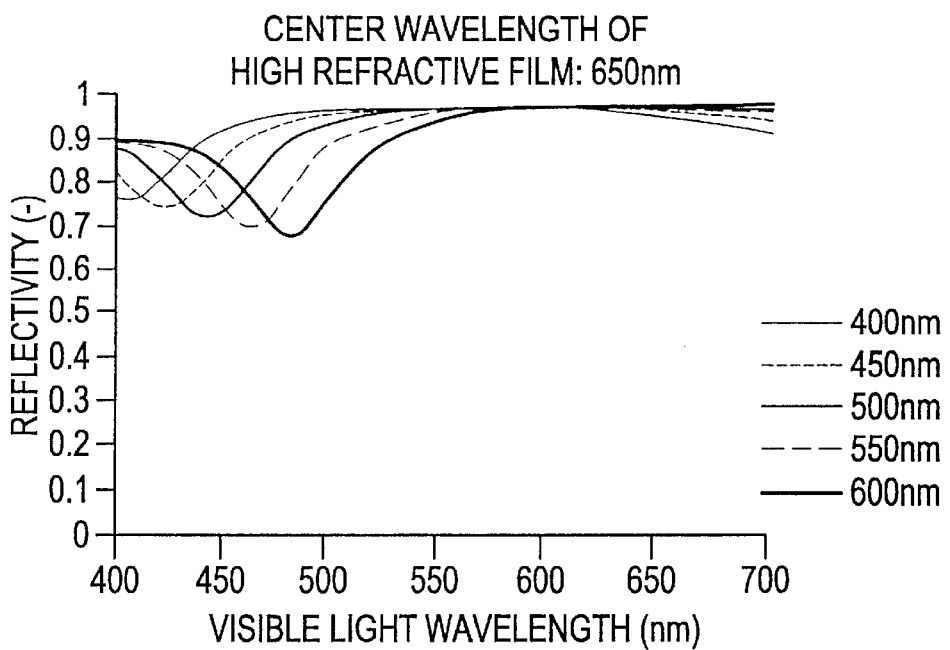
Figure 8B:
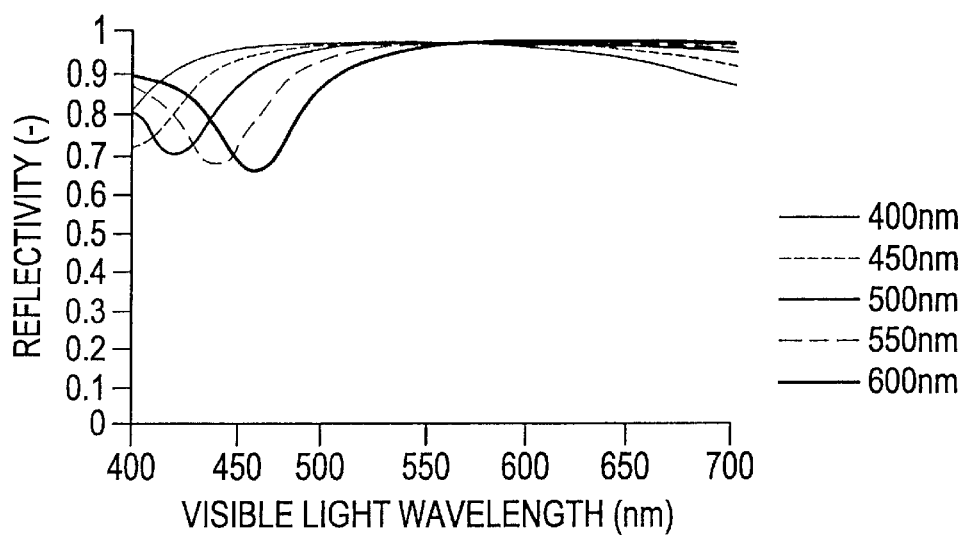

FIG. 8 demonstrates simulation results obtained through the present embodiment structure. FIGS. 8(A)–(C) are graphs wherein plots were made with respect to wavelength on a horizontal axis and reflectivity on a vertical axis. These graphs represent a case that the low refractive film center wavelength was varied with the high refractive film center wavelength fixed at 550 nm, 600 nm and 650 nm.

In actuality, much more data was acquired. However, the data is similar in the meaning of the general trend. That is, there is a tendency that the wavelength range in which the reflectivity lowers shifts toward a longer wavelength side as the center wavelengths of the low and high refractive films are given to a longer wavelength side.

Figure 9A:
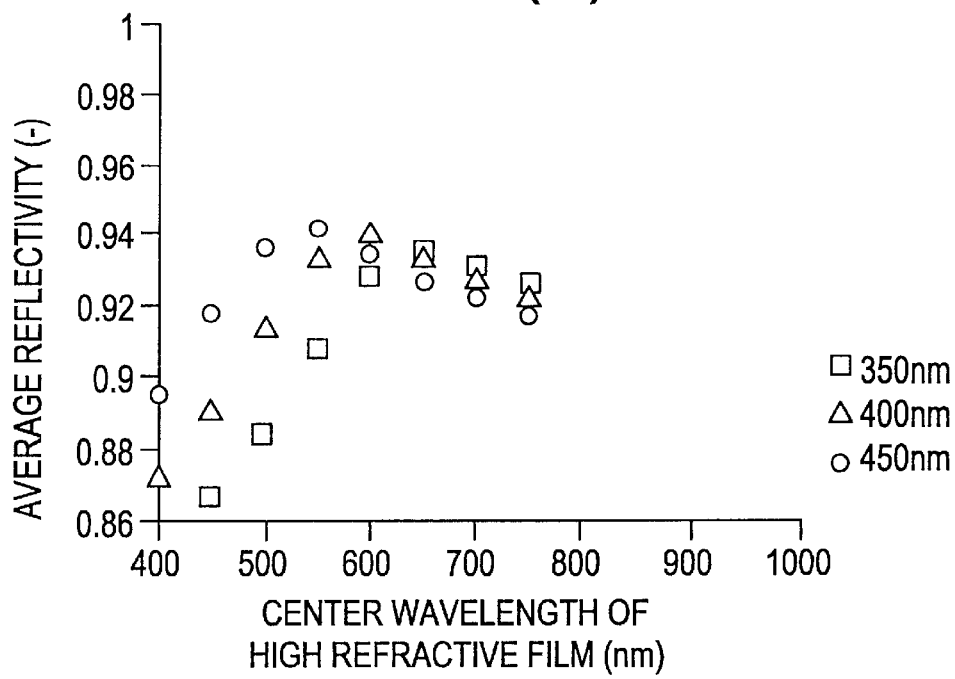
FIGS. 9(A) to 9(B) are diagrams showing an average reflectivity of the dielectric four-layered structure.
Figure 9B:
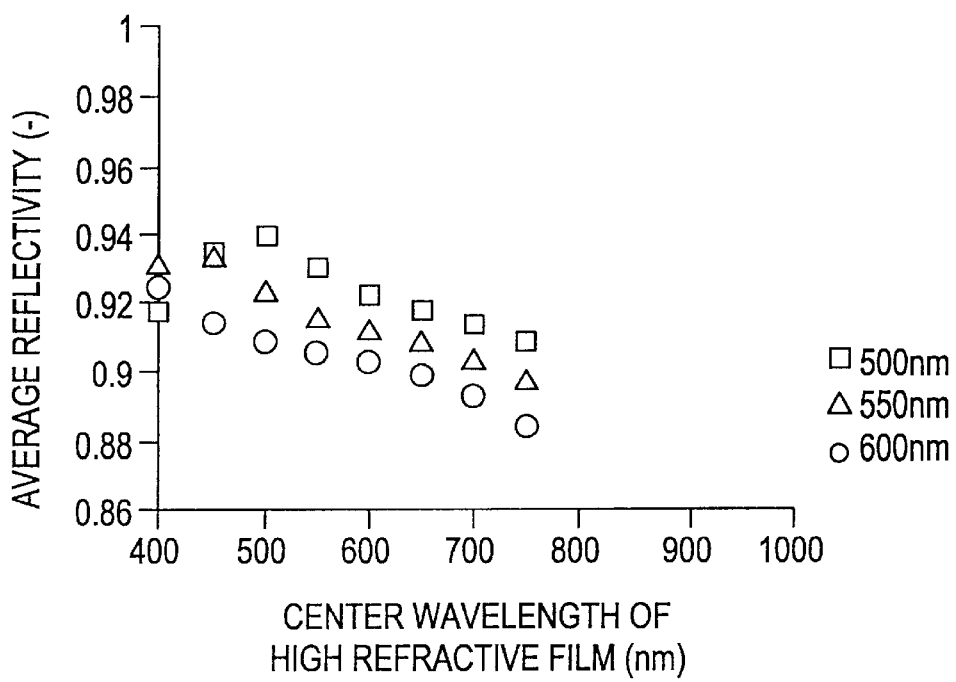

FIG. 9 demonstrates a collective representation of the above simulation results. In FIG. 9, plotting is made with data obtained by varying the low refractive film (dielectric films of 701, 703) center wavelength within a range of 350–600 nm wherein a horizontal axis represents high refractive film (dielectric films of 702 and 704) center wavelength and a vertical axis visible light range average reflectivity. The refractive indexes were taken 1.43 for the low refractive film and 2.04 for the high refractive film, similar to Embodiment 1, 2.

From FIG. 9, the present applicant determined a condition under which the average reflectivity in the visible light range becomes greater than 0.91, as follows:

$$500 \text{ nm} \leq \lambda_L \leq 550 \text{ nm}, 400 \text{ nm} \leq \lambda_H \leq 500 \text{ nm} \quad (1)$$

$$350 \text{ nm} \leq \lambda_L \leq 500 \text{ nm}, 500 \text{ nm} \leq \lambda_H \leq 550 \text{ nm} \quad (2)$$

$$350 \text{ nm} \leq \lambda_L \leq 500 \text{ nm}, 550 \text{ nm} \leq \lambda_H \leq 750 \text{ nm} \quad (3)$$

where $\lambda_L$ is a center wavelength of the low refractive film and $\lambda_H$ a center wavelength of the high refractive film. It is natural that the center wavelength to be set may be selected so as to satisfy any of the conditions (1), (2) and (3).

Further, a condition was determined under which the average reflectivity becomes greater than 0.93, as follows:

$$500 \text{ nm} \leq \lambda_L \leq 525 \text{ nm}, 400 \text{ nm} \leq \lambda_H \leq 500 \text{ nm} \quad (4)$$

$$450 \text{ nm} \leq \lambda_L \leq 500 \text{ nm}, 500 \text{ nm} \leq \lambda_H \leq 550 \text{ nm} \quad (5)$$

$$400 \text{ nm} \leq \lambda_L \leq 450 \text{ nm}, 550 \text{ nm} \leq \lambda_H \leq 650 \text{ nm} \quad (6)$$

$$350 \text{ nm} \leq \lambda_L \leq 400 \text{ nm}, 600 \text{ nm} \leq \lambda_H \leq 700 \text{ nm} \quad (7)$$

where the definitions of $\lambda_L$ and $\lambda_H$ are similar to the above. It is satisfactory if any of the conditions (4), (5), (6) and (7) is fulfilled.

As a consequence, where selecting a center wavelength from the range of the condition (1), if the first and third dielectric films have a film thickness and refractive index of $d_L$ and $n_L$ while the second and fourth dielectric films have a film thickness and refractive index of $d_H$ and $n_H$, then the film thickness $d_L$ for the first and third dielectric films and the film thickness $d_H$ for the second and fourth dielectric films are controlled so as to satisfy $500 \text{ nm} \leq \lambda_L \leq 550 \text{ nm}$ and $400 \text{ nm} \leq \lambda_H \leq 500 \text{ nm}$ (provided that $\lambda_L = 4n_L d_L$, $\lambda_H = 4n_H d_H$). This is, of course, true for the other ranges of the conditions (2)–(7).

Within the above range, it is possible to form a pixel electrode having an average reflectivity higher than 0.91 (preferably higher than 0.93) by properly setting the center wavelengths $\lambda_L$ and $\lambda_H$.

In practicality, the film thickness of the dielectric film formed by the low and high refractive films is controlled similarly to Embodiment 1 to have a desired center wavelength, forming an enhanced reflective film with a structure as stated above.

The above wavelength range will be wholly effective if refractive index ($n_L$) of the low refractive film and refractive index ($n_H$) of the high refractive film are combined to have a ratio ($n_L/n_H$) of smaller than 0.7, similar to Embodiment 1.

Meanwhile, it is effective to provide the low refractive film with a thickness smaller than the film thickness of the high refractive film in order to avoid against liquid crystal voltage loss due to dielectric capacitance, as is stated in Embodiment 1.

Embodiment 4

A reflective type LCD having the present embodiment structure was actually fabricated on an experimental basis in order to compare reflectivities between the cases where the invention is applied and is not applied, thus obtaining a result as shown in FIG. 10. Incidentally, the present embodiment used for the pixel electrode a material containing 1 wt % of titanium in an aluminum film. The film thickness was 200 nm.

The pixel electrode has thereon a dielectric multi-layered film, an orientation film (film thickness 240 nm), a liquid crystal layer (3 $\mu$m), an orientation film (240 nm), a transparent conductive film (120 nm) and a glass substrate, in the order from the below. The light transmitted through them is reflected on a surface of the pixel electrode. Consequently, the reflectivity obtained herein is a reflectivity including light loss due to the orientation film, etc.

It was confirmed as shown in FIG. 10 that the pixel electrode structure adopting the present invention apparently improved in reflectivity as compared with the structure with only a pixel electrode as a reference. Where the present invention was not applied, the average reflectivity in the visible light range was at 80.1%. However, the pixel electrode adopting the Embodiment 1 structure exhibited an average reflectivity of 85.5%. The pixel electrode adopting the Embodiment 2 structure exhibited an average reflectivity of 86.8%, thus greatly improved in reflectivity.

Also, the reflective type LCD was considered, by comparison, in liquid crystal threshold characteristic and liquid crystal response speed. As a result, it was confirmed that the application of the invention has no effect on the liquid crystal threshold characteristic and response speed and no adverse effect is given on the liquid crystal electric characteristic.

Further, a liquid crystal projector was actually assembled using the reflective type LCD adopting the present embodiment structure. Brighter display was possible as compared with the conventional, thus realizing improvement in brightness and contrast.

Embodiment 5

In this embodiment is explained a case that a spin coat technique is employed to form a dielectric film constituting an enhanced reflective film. The data shown in Embodiments 1–4 were on the dielectric films that have been formed by the spin coat technique.

To form a dielectric film by the spin coat technique, an application solution may use a colloidal solution dispersed with an inorganic solid matter in an organic solvent. The film thickness is determined by the solution concentration, the rotational speed for spin coat and the spinning time, etc. The condition may be appropriately determined by the practitioner because it differs depending on the kind of a dielectric film to be formed.

The present applicant used a solution of L-1001 (refractivity 1.43) made by Nissan Chemical Co., Ltd. diluted to 1/3 and a solution of H-1000 (refractivity 2.04) diluted to 1/3. The L-1001 application condition (spin time and rotation speed) was as 1st: 500 rpm, 5 sec, 2nd: 2000 rpm, 20 sec. Also, the H-1000 application condition was as 1st: 500 rpm, 5 sec, 2nd: 1000 rpm, 20 sec.

The dielectric film spin-coated was pre-baked at 90° C. for 5 minutes, and thereafter post-baked at 250° C. for 2 hours. It is natural that such a baking process (also called a cure process) is not limited to the present embodiment condition. In this manner, a dielectric film was obtained that had a desired refractive index and film thickness.

In the preset invention a dielectric film is formed after forming a pixel electrode (after performing a patterning process for forming pixel electrodes). Accordingly, the dielectric film must be formed in a manner covering over a step formed due to the pixel electrode.

For this reason, it is extremely effective to utilize, as in the present embodiment, a spin coat technique having a high step coverability. The utilization of a spin coat technique provides a dielectric film formed in a state satisfactorily planarizing over the step. The orientation film to be formed on that will be sufficiently flat. Therefore, a liquid crystal is provided on a flat surface thus preventing occurrence of discrenation due to the step, etc.

Embodiment 6

Figure 11:
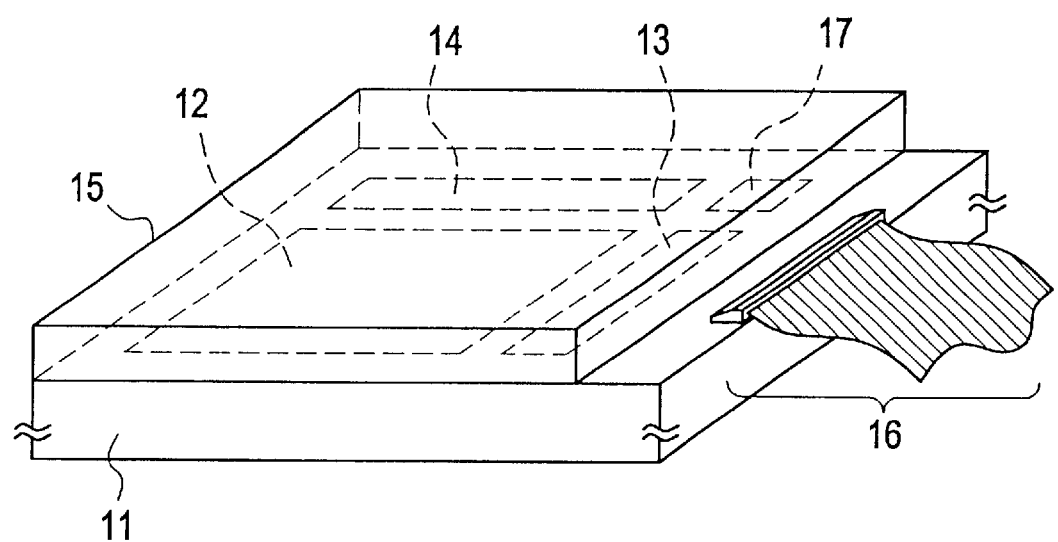
FIG. 11 is a view showing a structure of a liquid crystal display device.

Forming a structure of FIG. 1, FIG. 4 or FIG. 7 according to Embodiments 1–4, an orientation film is formed on the dielectric multi-layered film. Meanwhile, an opposite substrate provided with an opposite electrode and orientation film is prepared. A liquid crystal material is filled between the TFT substrate and the opposite substrate, thus completing an active matrix liquid crystal display device as shown in FIG. 11. The process of filling the liquid crystal material may be carried out by utilizing a known cell assembling process, and the detailed explanation is herein omitted.

Incidentally, in FIG. 11, 11 is a substrate having an insulation surface, 12 is a pixel matrix circuit, 13 is a source driver circuit, 14 is a gate driver circuit, 15 is an opposite substrate, 16 is a FPC (Flexible Printed Circuit), and 17 is a signal processing circuit.

As the signal processing circuit 17, such a circuit can be formed as have conventionally been used in an IC including a D/A converter, γ correction circuit, signal dividing circuit, etc. It is of course possible to perform signal processing by an IC chip provided on the glass substrate.

Although the present embodiment was explained on the liquid crystal display device as an example, it is needless to say that the present invention is applicable also to an EL (electroluminescence) display device or EC (electrochromics) display device provided that it is an active matrix display device.

Embodiment 7

The electro-optical device of the present invention is to be utilized as a display unit for various electronic appliances.

Such electronic appliances involve video cameras, still cameras, projectors, projection TVs, head-mount displays, car navigators, personal computers, portable information terminals (mobile computers, handy phones, etc.) and so on.

Figure 12A:
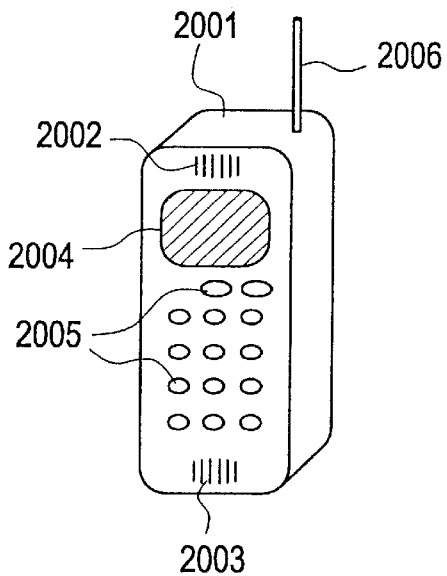
FIGS. 12(A) to 12(F) are views showing structures of electronic appliances.

FIG. 12(A) shows a handy phone structured by a main body 2001, a sound output section 2002, a sound input section 2003, a display unit 2004, an operation switch 2005 and an antenna 2006. The present invention can be applied to the display unit 2004.

Figure 12B:
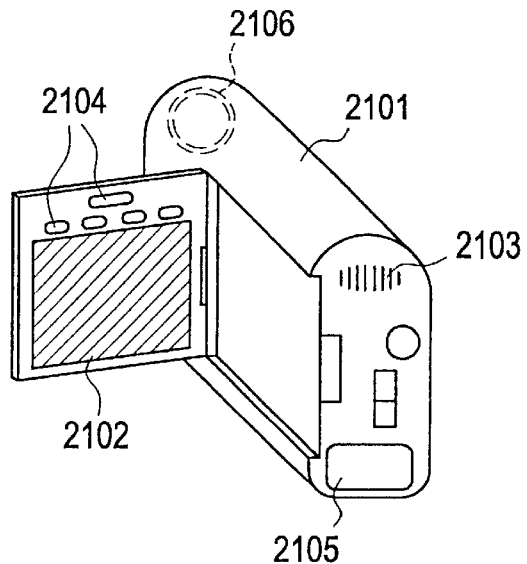

FIG. 12(B) shows a video camera structured by a main body 2101, a display unit 2102, a sound input section 2103, an operation switch 2104, a battery 2105 and an image receiving section 2106. The present invention can be applied to the display unit 2102.

Figure 12C:
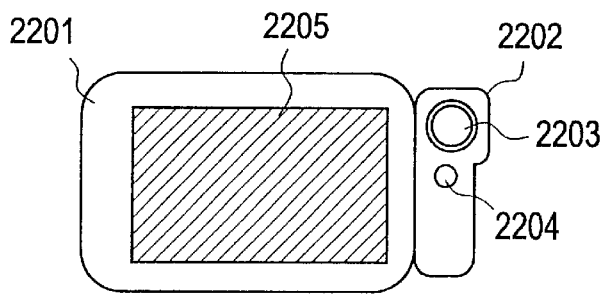

FIG. 12(C) shows a mobile computer structured by a main body 2201, a camera section 2202, an image receiving section 2203, an operation switch 2204, and a display unit 2205. The present invention can be applied to the display unit 2205.

Figure 12D:
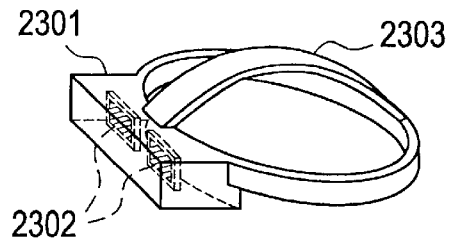

FIG. 12(D) shows a head-mount display structured by a main body 2301, a display unit 2302 and a band section 2303. The present invention can be applied to the display unit 2302.

Figure 12E:
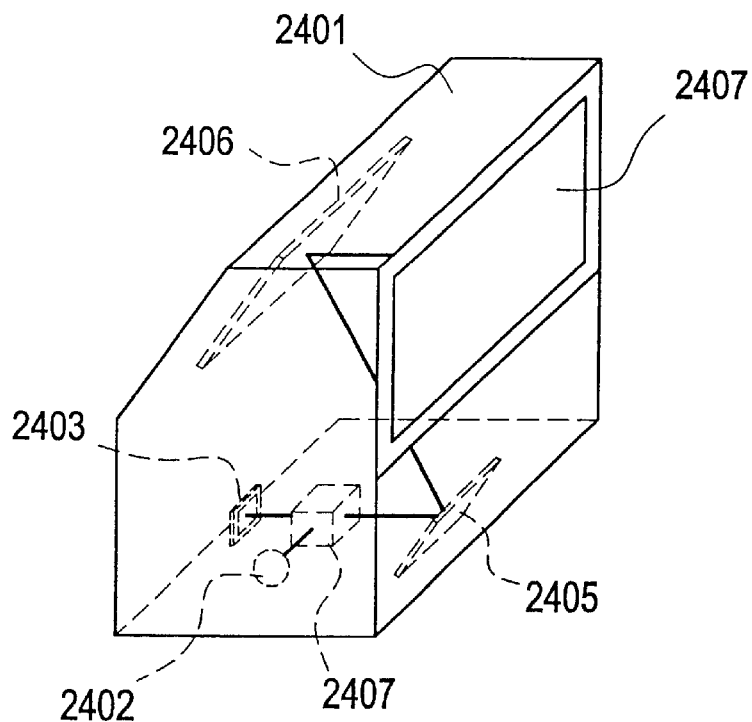

FIG. 12(E) shows a rear type projector structured by a main body 2401, a light source 2402, a display unit 2403, a polarizing beam splitter 2404, a reflector 2405, 2406 and a screen 2407. The present invention can be applied to the display unit 2403.

Figure 12F:
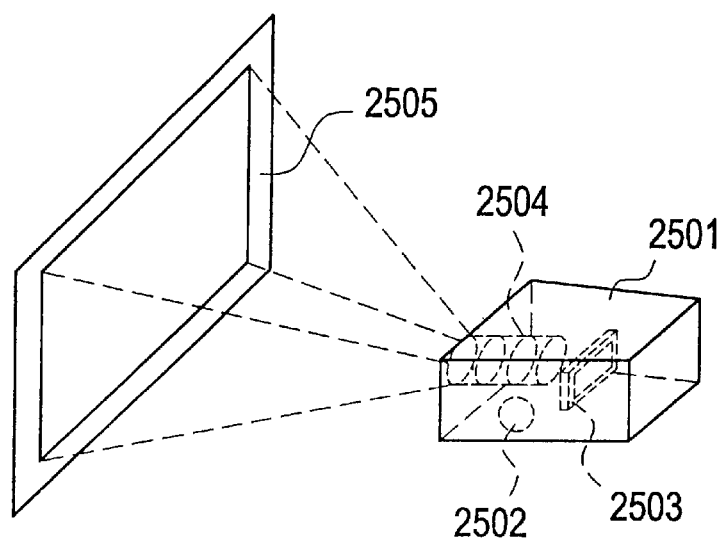

FIG. 12(F) shows a front type projector structured by a main body 2501, a light source 2502, a display unit 2503, an optical system 2504 and a screen 2505. The present invention can be applied to the display unit 2503.

As described above, the present invention is broad in application scope and capable of being applied to electronic appliances of every field.

Embodiment 8

CMOS circuits and pixel active matrix circuits produced by the embodiments of the present invention can be applied to a plurality of electro-optical devices (e.g. an active matrix type liquid crystal display, an active matrix type EL display, and an active matrix type EC display). That is, the present invention can be carried out for all the electric apparatus including such the electro-optical devices as display media.

As such an electronic apparatus, a video camera, a digital camera, a projector (rear type or front type), a head mount display (a goggle type display), a car navigation system, a personal computer, a portable information terminal (mobile computer, portable telephone, electric book, etc.) and the like are enumerated. Examples of those are shown in FIG. 13(A) to FIG. 13(F), FIG. 14(A) to FIG. 14(D), and FIG. 15(A) to FIG. 15(C).

Figure 13A:
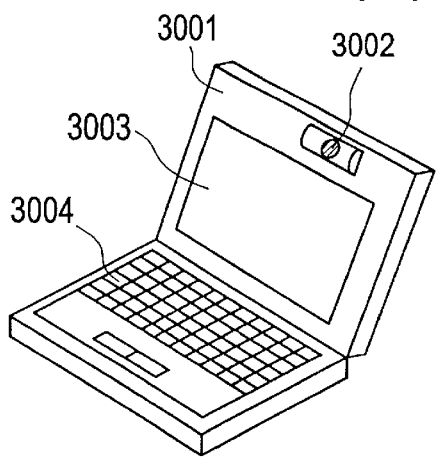
FIGS. 13(A) to 13(F) show examples of products to which the present invention is applied.

FIG. 13(A) shows a personal computer which is constituted by a main body 3001, an image input portion 3002, a display device 3003, and a keyboard 3004. The present invention can be applied to the image input portion 3002, the display device 3003, and other signal control circuits.

Figure 13B:
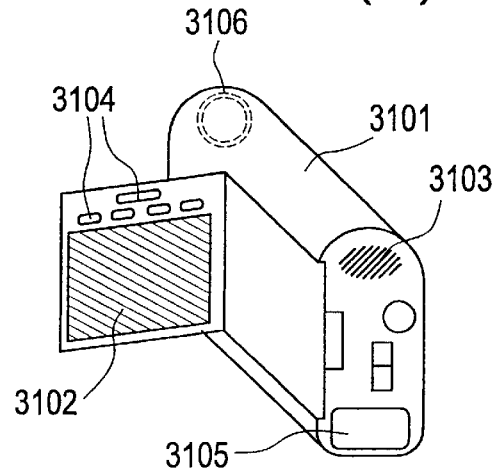

FIG. 13(B) shows a video camera which is constituted by a main body 3101, a display device 3102, an audio input portion 3103, an operation switch 3104, a battery 3105, and an image receiving portion 3106. The present invention can be applied to the display device 3102, the audio input portion 3103, and other signal control circuits.

Figure 13C:
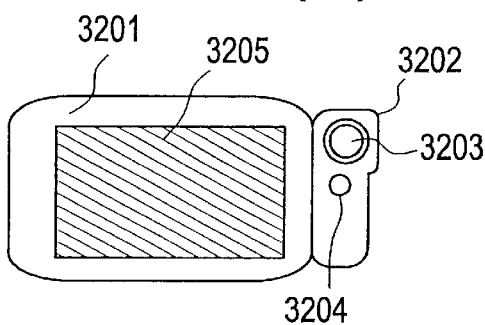

FIG. 13(C) shows a mobile computer which is constituted by a main body 3201, a camera portion 3202, an image receiving portion 3203, an operation switch 3204, and a display device 3205. The present invention can be applied to the display device 3205 and other signal control circuits.

Figure 13D:
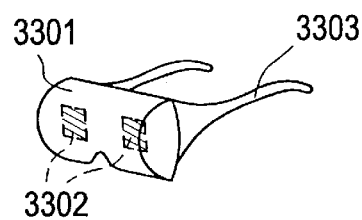

FIG. 13(D) shows a goggle type display which is constituted by a main body 3301, a display device 3302, and an arm portion 3303. The present invention can be applied to the display device 3302 and other signal control circuits.

Figure 13E:
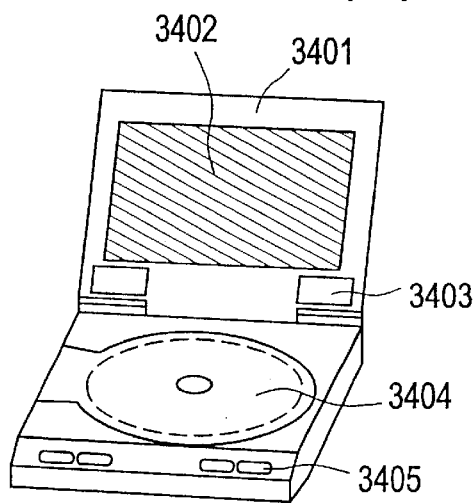

FIG. 13(E) shows a player apparatus which is equipped with a recording medium for recording a program (hereinafter, called "a recording medium"). The player apparatus is constituted by a main body 3401, a display device 3402, a speaker portion 3403, a recording medium 3404, an operation switch 3405 and an eternal input portion 3406. This apparatus includes a DVD (Digital Versatile Disc), a CD and the like as the recording medium for appreciating music and movies, for playing a game, and for the Internet. The present invention can be applied to the display device 3402 and other signal control circuits.

Figure 13F:
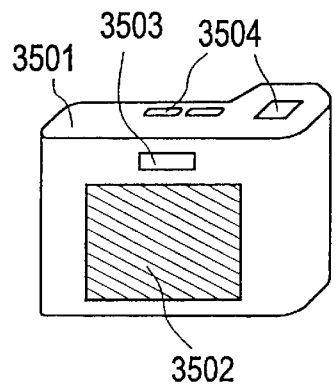

FIG. 13(F) shows a digital camera which is constituted by a main body 3501, a display device 3502, an eyepiece portion 3503, an operation switch 3504 and an image receiving portion (not shown). The present invention can be applied to the display device 3502 and other signal control circuits.

Figure 14A:
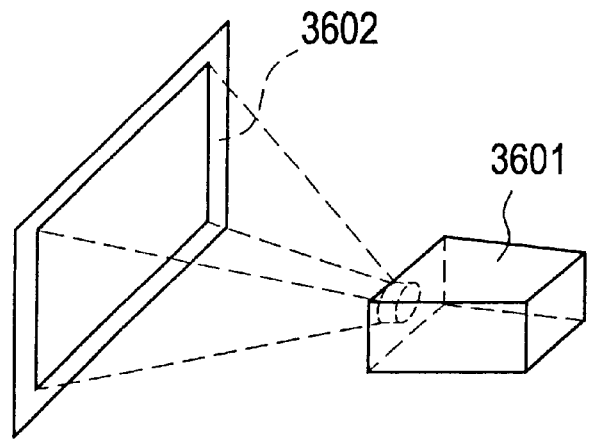
FIG. 14(A) shows a front type projector according to the present invention.

FIG. 14(A) shows a front type projector which is constituted by a light source optical system and a display device 3601, and a screen 3602. The present invention can be applied to the display device and other signal control circuits.

Figure 14B:
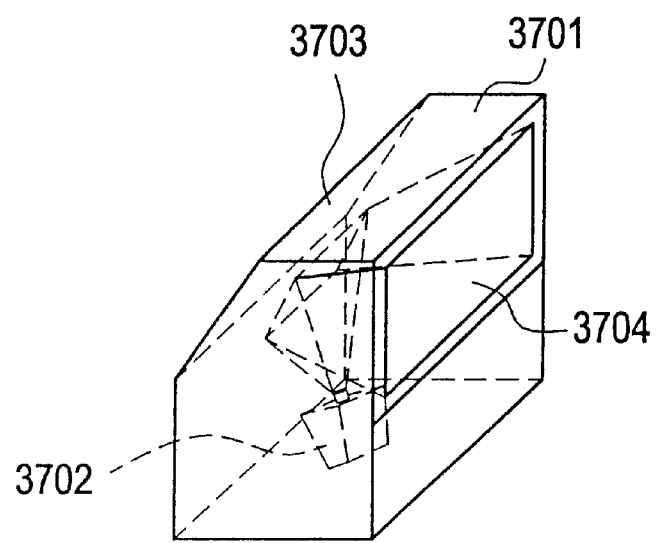
FIG. 14(B) shows a rear type projector according to the present invention.

FIG. 14(B) shows a rear type projector which is constituted by a main body 3701, a light source optical system and a display device 3702, a mirror 3703 and a screen 3704. The present invention can be applied to the display device and other signal control circuits.

Figure 14C:
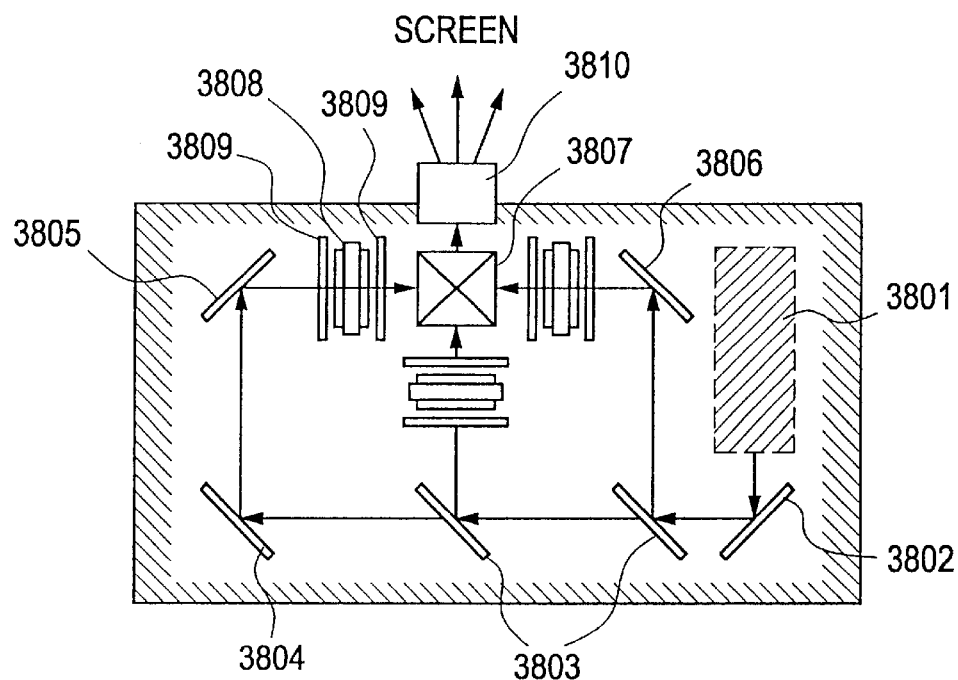
FIG. 14(C) shows an example structure of a light source optical system and a display device in FIG. 14(A) or in FIG. 14(B)

FIG. 14(C) shows an example structure of a light source optical system and a display device 3601 in FIG. 14(A), or 3702 in FIG. 14(B). Each of numerals 3601 and 3702 includes a light source optical system 3801, mirrors 3802, 3804–3806, a dichroic mirror 3803, another optical system 3807, a display device 3808, a phase difference plate 3809, and a projection optical system 3810. The projection optical system 3810 is constituted by a plurality of optical lenses equipped with a projection lens. Such a projection system as shown in FIG. 14(C) is called a three-plate type since this structure includes three plates of display devices. Further, it is proper for a researcher to form, in an optical path indicated by an arrow in FIG. 14(C), an optical lens, a film with polarizing characteristics, a film to control a phase difference, an IR film, etc.

Figure 14D:
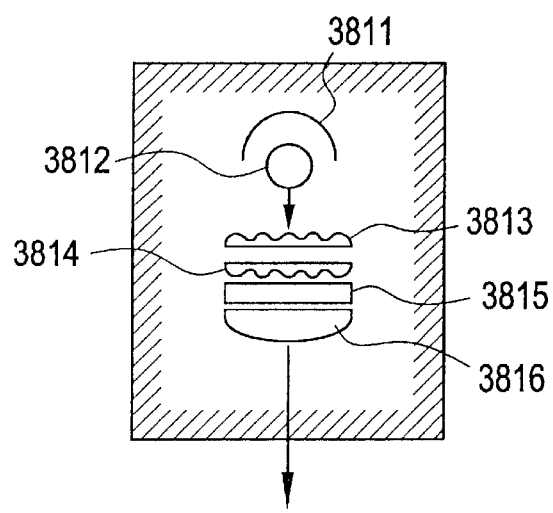

FIG. 14(D) shows an example structure of a light source optical system 3801 in FIG. 14(C). In this embodiment, the light source optical system 3801 includes a reflector 3811, a light source 3812, lens arrays 3813 and 3814, a polarizing conversion element 3815 and a condenser lens 3816. However, the present invention is not specifically limited by this embodiment because it is just an example. For example, in an optical path, an optical lens, a film with a polarizing characteristics, a film to control a phase difference, an IR film, etc. can be properly formed.

Figure 15A:
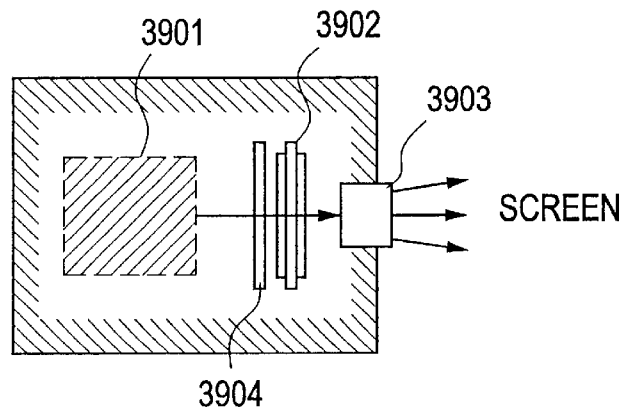
FIG. 15(A) shows a light source optical system and display device.

While FIG. 14(C) shows an example of the three-plate type, FIG. 15(A) shows an example of single-plate type. A light source optical system 3901, a display device 3902, and a projection optical system 3903 are included in a light source optical system and a display device shown in FIG. 15(A). It is possible to apply the light source optical system and display device shown in FIG. 15(A) to the light source optical system and display device 3601 shown in FIG. 14(A), or 3702 in FIG. 14(B). Further, the light source optical system 3901 can be applied by the light source optical system shown in FIG. 14(D). In addition, the display device 3902 is equipped with a color filter (not shown), so that display image is colored.

Figure 15B:
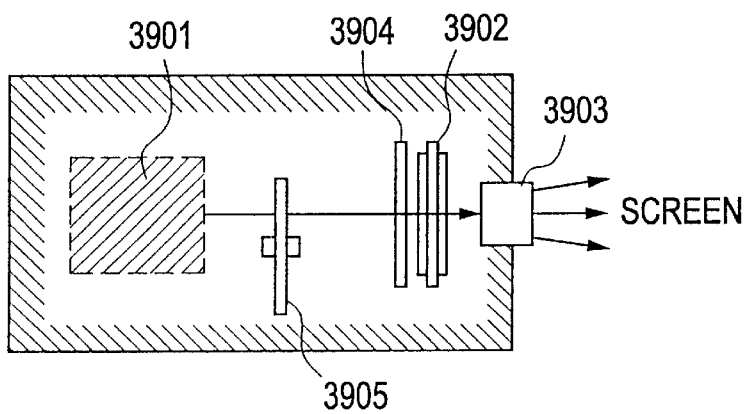
FIG. 15(B) shows a light source optical system and display device.

FIG. 15(B) shows an applied example of a light source optical system and a display device which is applied by FIG. 15(A) Instead of forming a color filter, a display image is colored by RGB rotary color filter disc 3905. It is possible to apply the light source optical system and display device shown in FIG. 15(B) to the light source optical system and display device 3601 shown in FIG. 14(A), or 3702 in FIG. 14(B).

Figure 15C:
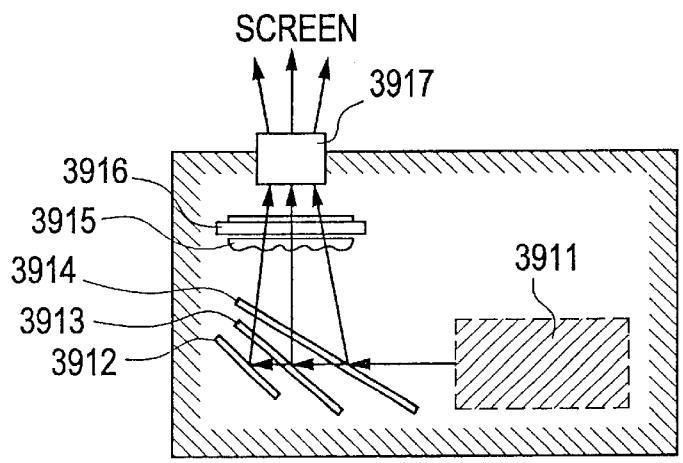
FIG. 15(C) shows a structure of a light source optical system and display device.

A structure of the light source optical system and display device, as shown in FIG. 15(C) is called as a color-filterless single-plate type. In this structure, a display device 3916 is equipped with a microlens array 3915, and a display image is colored by a dichroic mirror (Green) 3912, a dichroic mirror (Red) 3913 and a dichroic mirror (Blue). A projection optical system 3917 is constituted by a plurality of lenses including a projection lens. It is possible to apply the light source optical system and display device shown in FIG. 15(C) to the light source optical system and display device 3601 shown in FIG. 14(A), or 3702 in FIG. 14(B). Further, as the light source optical system 3911, an optical system having a coupling lens and a collimating lens other than a light source can be applied.

As described above, the present invention can be applied in a large range, so that it is possible to apply the present invention to any electric apparatus in every field. In addition, the electric apparatus in the instant invention can be realized by using any structure combined with Embodiments.

By practicing the present invention it is possible to greatly improve the reflectivity on a pixel electrode using an aluminum based material. The reflection light exhibited a flat characteristic having almost a constant value in a visible light range with a wavelength of 400–700 nm.

In particular, where provided with an enhanced reflective film formed with two layers of dielectric films, the reflection light is favorable in flatness. Further, liquid crystal voltage loss could be suppressed as low as possible because the thickness of the enhanced reflective film itself may be thin.

Further, although the structure with overlying four dielectric film layers has an increased average reflectivity as compared with the two layered structure, there is tendency toward increase in wavelength dependency. However, the present invention provides a flat reflection characteristic without such wavelength dependency.

From the above, it is possible to fabricate a liquid crystal display device at a low cost having a pixel electrode with a reflectivity of 91% or higher (preferably 93% or higher) by using a versatile aluminum based material without utilizing a silver electrode or the like which is difficult to form.

Also, by improving the light reflectivity on the pixel electrode to effectively utilize the light, a bright display is possible even if a backlight output is suppressed. That is, the electric power to be consumed by the backlight is decreased, realizing a liquid crystal display device high in cost performance.

Furthermore, it is possible to improve the contrast and brightness for an electronic appliance (particularly, liquid crystal projectors and so on) mounted with such a liquid crystal display device as a display unit.

What is claimed is:

1. A reflective liquid crystal device comprising:
a pixel electrode comprising a metal;
a first dielectric film provided over said pixel electrode;
a second dielectric film provided over said first dielectric film and having a higher refractive index than said first dielectric film and having a same center wavelength as said first dielectric film;
a third dielectric film provided over said second dielectric film; and
a fourth dielectric film provided over said third dielectric film and having a higher refractive index than said third dielectric film and having a same center wavelength as said third dielectric film,
wherein
provided that a refractive index of said first dielectric film is $n_L$ and a refractive index of said fourth dielectric film is $n_H$ and film thicknesses of said first and fourth dielectric films are respectively $d_1$ and $d_4$, then said first and fourth dielectric films are adjusted in thickness to satisfy 400 nm $\leq \lambda_A \leq$ 570 nm and 400 nm $\leq \lambda_B \leq$ 800 nm where $\lambda_A = 4n_L d_1$ and $\lambda_B = 4n_H d_4$.

2. A reflective liquid crystal device comprising:
a pixel electrode comprising a metal;
a first dielectric film provided over said pixel electrode;
a second dielectric film provided over said first dielectric film and having a higher refractive index than said first dielectric film and having a same center wavelength as said first dielectric film;
a third dielectric film provided over said second dielectric film; and
a fourth dielectric film provided over said third dielectric film and having a higher refractive index than said third dielectric film and having a same center wavelength as said third dielectric film,
wherein
provided that a refractive index of said second dielectric film is $n_H$ and a refractive index of said third dielectric film is $n_L$ and thicknesses of said second and third dielectric films are respectively $d_2$ and $d_3$, then said second and third dielectric films are adjusted in thickness to satisfy 400 nm $\leq \lambda_A \leq$ 570 nm and 400 nm $\leq \lambda_B \leq$ 800 nm where $\lambda_A = 4n_H d_2$ and $\lambda_B = 4n_L d_3$.

3. A reflective liquid crystal device comprising:
a pixel electrode comprising an element selected from the group consisting of aluminum, silver, tantalum and chromium;
a first dielectric film provided over said pixel electrode;
a second dielectric film provided over said first dielectric film and having a higher refractive index than said first dielectric film and having a same center wavelength as said first dielectric film;
a third dielectric film provided over said second dielectric film; and
a fourth dielectric film provided over said third dielectric film and having a higher refractive index than said third dielectric film and having a same center wavelength as said third dielectric film,
wherein
provided that a refractive index of said first dielectric film is $n_L$ and a refractive index of said fourth dielectric film is $n_H$ and film thicknesses of said first and fourth dielectric films are respectively $d_1$ and $d_4$, then said first and fourth dielectric films are adjusted in thickness to satisfy 400 nm $\leq \lambda_A \leq$ 570 nm and 400 nm $\leq \lambda_B \leq$ 800 nm where $\lambda_A = 4n_L d_1$ and $\lambda_B = 4n_H d_4$.

4. A reflective liquid crystal device comprising:
a pixel electrode comprising an element selected from the group consisting of aluminum, silver, tantalum and chromium;
a first dielectric film provided over said pixel electrode;
a second dielectric film provided over said first dielectric film and having a higher refractive index than said first dielectric film and having a same center wavelength as said first dielectric film;
a third dielectric film provided over said second dielectric film; and
a fourth dielectric film provided over said third dielectric film and having a higher refractive index than said third dielectric film and having a same center wavelength as said third dielectric film,
wherein
provided that a refractive index of said second dielectric film is $n_H$ and a refractive index of said third dielectric film is $n_L$ and thicknesses of said second and third dielectric films are respectively $d_2$ and $d_3$, then said second and third dielectric films are adjusted in thickness to satisfy 400 nm $\leq \lambda_A \leq$ 570 nm and 400 nm $\leq \lambda_B \leq$ 800 nm where $\lambda_A = 4n_H d_2$ and $\lambda_B = 4n_L d_3$.

5. A device according to claim 1 wherein said reflective liquid crystal device is incorporated into one selected from the group consisting of handy phone, video camera, mobile computer, head-mount display, rear type projector, front type projector, personal computer, player equipped with a recording medium, and digital camera.

6. A device according to claim 2 wherein said reflective liquid crystal device is incorporated into one selected from the group consisting of handy phone, video camera, mobile computer, head-mount display, rear type projector, front type projector, personal computer, player equipped with a recording medium, and digital camera.

7. A device according to claim 3 wherein said reflective liquid crystal device is incorporated into one selected from the group consisting of handy phone, video camera, mobile computer, head-mount display, rear type projector, front type projector, personal computer, player equipped with a recording medium, and digital camera.

8. A device according to claim 4 wherein said reflective liquid crystal device is incorporated into one selected from the group consisting of handy phone, video camera, mobile computer, head-mount display, rear type projector, front type projector, personal computer, player equipped with a recording medium, and digital camera.

9. A device according to claim 1 wherein said refractive index ($n_L$) and said refractive index ($n_H$) are in a relationship of $n_L/n_H \leq 0.7$.

10. A device according to claim 2 wherein said refractive index ($n_L$) and said refractive index ($n_H$) are in a relationship of $n_L/n_H \leq 0.7$.

11. A device according to claim 3 wherein said refractive index ($n_L$) and said refractive index ($n_H$) are in a relationship of $n_L/n_H \leq 0.7$.

12. A device according to claim 4 wherein said refractive index ($n_L$) and said refractive index ($n_H$) are in a relationship of $n_L/n_H \leq 0.7$.

13. A device according to claim 1 wherein said first dielectric film comprises a material selected from the group consisting of acrylic resin, polyimide, magnesium fluoride and silicon dioxide.

14. A device according to claim 1 wherein said third dielectric film comprises a material selected from the group consisting of acrylic resin, polyimide, magnesium fluoride and silicon dioxide.

15. A device according to claim 1 wherein said second dielectric film comprises a material selected from the group consisting of titanium dioxide, zirconia, indium tin oxide, silicon nitride and cerium dioxide.

16. A device according to claim 1 wherein said fourth dielectric film comprises a material selected from the group consisting of titanium dioxide, zirconia, indium tin oxide, silicon nitride and cerium dioxide.

17. A device according to claim 2 wherein said first dielectric film comprises a material selected from the group consisting of acrylic resin, polyimide, magnesium fluoride and silicon dioxide.

18. A device according to claim 2 wherein said third dielectric film comprises a material selected from the group consisting of acrylic resin, polyimide, magnesium fluoride and silicon dioxide.

19. A device according to claim 2 wherein said second dielectric film comprises a material selected from the group consisting of titanium dioxide, zirconia, indium tin oxide, silicon nitride and cerium dioxide.

20. A device according to claim 2 wherein said fourth dielectric film comprises a material selected from the group consisting of titanium dioxide, zirconia, indium tin oxide, silicon nitride and cerium dioxide.

21. A device according to claim 3 wherein said first dielectric film comprises a material selected from the group consisting of acrylic resin, polyimide, magnesium fluoride and silicon dioxide.

22. A device according to claim 3 wherein said third dielectric film comprises a material selected from the group consisting of acrylic resin, polyimide, magnesium fluoride and silicon dioxide.

23. A device according to claim 3 wherein said second dielectric film comprises a material selected from the group consisting of titanium dioxide, zirconia, indium tin oxide, silicon nitride and cerium dioxide.

24. A device according to claim 3 wherein said fourth dielectric film comprises a material selected from the group consisting of titanium dioxide, zirconia, indium tin oxide, silicon nitride and cerium dioxide.

25. A device according to claim 4 wherein said first dielectric film comprises a material selected from the group consisting of acrylic resin, polyimide, magnesium fluoride and silicon dioxide.

26. A device according to claim 4 wherein said third dielectric film comprises a material selected from the group consisting of acrylic resin, polyimide, magnesium fluoride and silicon dioxide.

27. A device according to claim 4 wherein said second dielectric film comprises a material selected from the group consisting of titanium dioxide, zirconia, indium tin oxide, silicon nitride and cerium dioxide.

28. A device according to claim 4 wherein said fourth dielectric film comprises a material selected from the group consisting of titanium dioxide, zirconia, indium tin oxide, silicon nitride and cerium dioxide.

* * * * *